(12) United States Patent
Takeda et al.

(10) Patent No.: US 7,599,682 B2
(45) Date of Patent: Oct. 6, 2009

(54) METHOD OF IMPLEMENTING MULTI-PARTY CONFERENCE SERVICE BY USING BROADCAST/MULTICAST SERVICE OF A WIRELESS COMMUNICATIONS SYSTEM

(75) Inventors: Yukiko Takeda, Tokorozawa (JP); Shiro Tanabe, Hidaka (JP); Peng Yang, Beijing (CN); Hui Deng, Beijing (CN); Yuanchen Ma, Beijing (CN); Hiroki Ikeda, Beijing (CN)

(73) Assignee: Hitachi Communication Technologies, Ltd., Tokyo (JP)

( * ) Notice: Subject to any disclaimer, the term of this patent is extended or adjusted under 35 U.S.C. 154(b) by 486 days.

(21) Appl. No.: 11/347,314

(22) Filed: Feb. 6, 2006

(65) Prior Publication Data

US 2006/0223510 A1 Oct. 5, 2006

(30) Foreign Application Priority Data

Mar. 31, 2005 (CN) .................... 2005 1 0062665

(51) Int. Cl.
*H04M 3/42* (2006.01)
(52) U.S. Cl. ...................... 455/415; 370/312
(58) Field of Classification Search .............. None
See application file for complete search history.

(56) References Cited

U.S. PATENT DOCUMENTS

| | | |
|---|---|---|
| 2002/0102999 A1 | 8/2002 | Maggenti |
| 2003/0012149 A1 | 1/2003 | Maggenti |
| 2004/0057449 A1 | 3/2004 | Black |
| 2004/0125760 A1 | 7/2004 | Newberg et al. |
| 2004/0125802 A1 | 7/2004 | Lillie |
| 2005/0075107 A1* | 4/2005 | Wang et al. ............. 455/435.1 |
| 2006/0034202 A1* | 2/2006 | Kuure et al. ................ 370/312 |

\* cited by examiner

*Primary Examiner*—Lester Kincaid
*Assistant Examiner*—Phuoc Doan
(74) *Attorney, Agent, or Firm*—Brundidge & Stanger, P.C.

(57) ABSTRACT

This invention provides a method of implementing a multi-party conference service (MPCS) using broadcast/multicast service of a wireless communications system used for a conference focus, the context of a corresponding broadcast/multicast service session is generated based on the media flow information, multicast service session information and MPCS information. The generated context of the broadcast/multicast service session is then sent respectively to at least one content provider server, at least one mobile terminal and the broadcast/multicast service controller so that the one or more mobile terminals acquires the content media flow through the broadcast/multicast service session.

23 Claims, 17 Drawing Sheets

```
INVITE sip : BC@xx.com SIP/2.0
Via : SIP/2.0/UDP [5555.aaa.bbb.ccc.ddd] : 1357 ; branch = z9hG4bKnashds7
Max - Forwards : 70
From : <sip : Conf_ID@conf, com> ; tag = 171828
To : <sip : BC@xx.com>
Call - ID : cb03a0s09a2sdfglkj490333
Cseq : 127 INVITE
Contact : <sip : A@aa.com>
content - Type : application/sdp
cotent - length : (. . . )

v = 0
o = - 2987933612 2987933612 IN IP6 5555.aaa.bbb.ccc.ddd
s = -
c = IN IP6 5555.aaa.bbb.ccc.ddd
i = BCMCS - Progam1
u = <Conf_ID@conf.com>
t = 3034423619 3042462419
r = 604800 3600 0 90000
k = based64 : <encryption key>
m = video 2008 RTP/AVP 98
b = AS : 512
a = rtpmap : 98 H.263
a = fmtp : 98 profile - level - id = 0
m = audio 2009 RTP/AVP97
a = rtpmap : 97 AMR
a = fmtp : 97 mode - set = 0,2,5,7 ; maxframes = 2
. . . . .
```

*FIG. 16*

```
UPDATE sip : B@bb.com SIP/2.0
Via : SIP/2.0/UDP [5555.aaa.bbb.ccc.ddd] : 1357 ; branch = z9hG4bKnashds7
Max - Forwards : 70
From : <sip : Conf_ID@conf, com> ; tag = 171828
To : <sip : B@bb.com>
Call - ID : cb03a0s09a2sdfglkj490555
Cseq : 128 UPDATE
Contact : <sip : BC@xx.com>
content - Type : application/sdp
cotent - length : (. . .)

v = 0
o = - 2987933612 2987933612 IN IP6 5555.aaa.bbb.ccc.ddd
s = -
c = IN IP6 FF18 : : FFFF : EEEE
i = BCMCS - Progam1
u = <Conf_ID@conf.com>
t = 3034423619 3042462419
r = 604800 3600 0 90000
k = based64 : <encryption key>
m = video 19101 RTP/AVP 98 99
b = AS : 512
a = rtpmap : 98 H.263
a = fmtp : 98 profile - level - id = 0
a = <video's BCMCS _ flow _ ID>
m = audio 19102 RTP/AVP97
a = rtpmap : 97 AMR
a = fmtp : 97 mode - set = 0,2,5,7 ; maxframes = 2
a = <audio's BCMCs _ flow _ ID>
. . . . .
```

FIG. 17

```
SUBSCRIBE sip  : Conf_ID@conf.com SIP/2.0
To : <sip : B@bb.com>
From : <sip : Conf_ID@conf.com> ; tag = 171828
Call-ID : cb03a0s09a2sdfglkj490555
Event : BCMCS-SC ; idA
Accept : application/BCMCS-SC+xml
Cseq : 130 SUBSCRIBE
Contact : <sip : Conf_ID@conf.com>
Content - Length : 0
```

FIG. 18

```
NOTIFY sip : B@bb.com SIP/2.0
From : <sip : Conf_ID@conf.com> ; tag = 171828
To : <sip : B@bb.com>;
Call-ID : cb03a0s09a2sdfglkj490555
Event : BCMCS-SC ; idA
Subscription - State : active ; expires = 750
Cseq : 131 NOTIFY
Contact : <sip : Conf_ID@conf.com>
Content - Type : application/BCMCS-SC+xml
Content - Length : . . .
```

FIG. 19

METHOD OF IMPLEMENTING MULTI-PARTY CONFERENCE SERVICE BY USING BROADCAST/MULTICAST SERVICE OF A WIRELESS COMMUNICATIONS SYSTEM

CLAIM OF PRIORITY

The present application claims priority from Chinese patent application CN 200510062665.6 filed on Mar. 31, 2005, the content of which is hereby incorporated by reference into this application.

FIELD OF THE INVENTION

This invention relates to a method and device which implement a multi-party conference service in a communication network. In particular, it relates to a method and device which implement a multi-party conference service by using the broadcast/multicast service of a wireless communications system.

BACKGROUND OF THE INVENTION

A multi-party conference service (MPCS) is a media flow service which provides audio and video for a multi-party conference group composed of plural members. Each user who is member (hereinafter, referred to as "member user") can not only receive the media flow but also send the media flow to the multi-party conference group.

However, in the usual situation, the media flow of content received by each member of the multi-party conference service group is almost identical. Therefore, in the MPCS, peer-to-peer transmission, multicast transmission or concentrated unicast transmission can be used to send the media flow. Plural drafts were submitted by a Session Initiation Proposal Investigation (SIPPING) working group organized by an Internet Engineering Task Force (IETF), and the frame and session control of the MPCS were defined based on a Session Initiation Protocol (SIP). Among these, a third party session control proposal which was submitted, was intended to suit a densely interconnected MPCS system.

FIG. 1 is a topological diagram of the network of a multi-party conferencing system submitted by the SIPPING working group organized by with IETF.

The multi-party conferencing system based on SIP comprises a conference focus 4, member user 1, media server 3 and SIP server 2 as shown in FIG. 1, and since signaling (shown by a dotted line 101 in the diagram) relations between all the member users 1 in the conference group are maintained by a conference focus signal unit of the SIP conference service, the conference focus 4 is formed in the star-shaped network topology shown in FIG. 1.

The main task in the conference focus 4 is to guarantee to effectively send the media flow concerning the conference to the member users 1.

For this, the support of one or more of the media servers 3 is required. The role of the media server 3 is to receive one or more media flows, and after processing them, send the one or more media flows.

The solid arrow 103 and dotted arrow 102 in FIG. 1 respectively show the down-link and up-link, respectively. The conference focus 4 is effectively disposed relative to the media server 3 by adjusting the media policy.

Each conference service has its own conference group policy and media policy, and all these policies can be accessed by the conference focus 4.

In general, the conference group policy can be understood as a context of the session which describes by what method the conference service should be offered.

One of the tasks of the conference focus is how to execute these policies. When a change occurs to these policies, the conference focus must be informed thereof. These changes touch off some sort of SIP signaling (e.g., a certain user who is refused by sending a leaving message (BYE)). The member users should be informed of all of these changes via a conference notification service.

The XCON (Centralized Conferencing) working group of IETF defines the contents which relate to the conference group policy and the media policy. In the conference service, it is uniquely indicated by the Uniform Resource Identifiers (URI) of the SIP, and the URI uniquely indicates the conference focus related thereto. For example, the URI of the conference service is set to SIP:CONF_ID@conference.com, and this indicator is the SIP URI of the conference focus.

Some proposals have been submitted to solve the problems associated with the group control policy and media control policy of the multi-party conference service also in the XCON working group of IETF. MPCS can be widely implemented on operators' networks, and supports many applications such as, e.g., video conference, distribution type video games and forwarding of local information because of easy application expansion.

In the MPCS service group, since the member user's received media flow is almost identical in most situations, in theory, the resource utilization in the mobile network can be decreased by using the layer 3 IP multicast. However, the related wireless connection network cannot support a layer 3 IP multicast when some member users are using mobile terminals (e.g., the mobile terminal CDMA 2000) to connect to the MPCS service group. Therefore, the media flow can be sent to these users only by using the unicast method shown in FIG. 1. When the number of users who use mobile terminals increases, such a method leads to serious wastage of resources.

In such a situation, an ideal method of resolving this problem is to implement transmission of the media flow related to MPCS by using broadcast/multicast service technology which can provide a service for plural mobile terminals using one wireless resource. The superior point of such a method is that it can be optimized for resource utilization of a wireless communications system related to MPCS.

There are various frameworks for the broadcast/multicast service in a conventional wireless communication network, but here, the broadcast/multicast service system configuration will be described taking only the example of the broadcast/multicast service (BCMCS) of the CDMA 2000 system.

FIG. 2 is a distribution simplified view of a function node of the BCMCS system.

As shown in FIG. 2, a BCMCS controller 8 manages information related to the BCMCS session by a core network apparatus, and related information is provided for each Packet Data Serving Node (PDSN), Broadcast Serving Node (BSN), BCMCS mobile terminal 5 and BCMCS content server 7. The BCMCS controller 8 sends information related to the BCMCS session to the Packet Data Serving Node and the Broadcast Serving Node via an interface 202. After authorization of service is received, the cost is calculated for this information (executed by the AAA unit of FIG. 2).

An interface 203 in FIG. 2 provides information related to the current BCMCS session for the BCMCS mobile terminal 5. This interface is referred to also as BCMCS information acquisition, and it performs authorization of the BCMCS mobile terminal 5, authorization confirmation and integrity protection, and prepares to send the BCMCS session of the BCMCS mobile terminal 5. The interface between the BCMCS controller 8 and a BCMCS content provider 6 is not defined in 3GPP2.

The media flow of the BCMCS session was sent from the BCMCS content provider 6. The BCMCS content provider 6 may be installed in a mobile communication operators' network, or it may be provided by a third party. After receiving the media flow sent from plural BCMCS content provider 6 via an interface 204 of FIG. 2, the BCMCS content server 7 performs various processing on the media flow under the control of the BCMCS controller 8. Next, the BCMCS content server 7 forwards the BCMCS media flow generated via a multicast router (MR) and Broadcast Serving Node (BSN) to the CDMA 2000 wireless connection network. Both the Packet Control Functional units (PCF) and Access network (AN) apparatus generate extra IP multicast packets, and can send them one after another.

The BCMCS controller 8 also has some security functions, e.g., it has the function of generating a security key and sending it to the BCMCS mobile terminal 5. The BCMCS controller 8 is also responsible for authorization control of the BCMCS content provider 6 and forwarding of the media flow to the BCMCS content server 7 of the BCMCS content provider 6.

It is ideal if the member user of the multi-party conference service is a mobile terminal (e.g., CDMA 2000 mobile terminal), the media flow can be received by using broadcast/multicast service technology (BCMCS technology shown in FIG. 2), and the broadcast/multicast service technology is combined with MPCS, which solves the resource utilization problem. However, only the service frame and the service policy are defined in the method related to MPCS proposed by IETF, and it has nothing to do with prospective solutions for different member user features. In order to combine the broadcast/multicast service technology with MPCS, there is first the problem that the BCMCS controller controls an associated BCMCS session via the MPCS service, and the status of the connection network is also different from that of other member users. Therefore, the problem of how to combine broadcast/multicast service technology with the MPCS service in a seamless manner was still unresolved.

In the prior art, there are some patent applications concerning a multi-party conference service based on SIP. For example, some of the proposed solutions are used to control a group communication session, and the majority relate to mobile networks (US Patent applications US2004/0057449A1, US2003/0012149A1 and US2002/0102999A1). However, the purpose of these patent applications is mainly to improve the function of a PTT (Push-To-Talk) system, and none of them relate to a broadcast/multicast service.

In addition, some patent applications propose solutions for resolving the group communication session of different connection network member users, but they still do not relate to BCMCS (US Patent applications US2004/0125802A1 and US2004/0125760). In short, some of the current patent applications related to MPCS do not deal with broadcast multicast service content.

Therefore, since the problem of using broadcast/multicast service technology in MPCS was not yet resolved, it was impossible to use broadcast/multicast service technology in a seamless way in MPCS.

SUMMARY OF THE INVENTION

It is therefore an object of this invention to collate broadcast/multicast service technology with a multi-party conference service (MPCS), and to use the wireless resources related to the member user of the mobile terminal effectively in a wireless communication network.

According to one aspect of this invention, there is provided a method of implementing a multi-party conference service (MPCS) using broadcast/multicast service of a wireless communications system used for a conference focus, wherein a media flow is provided for at least one mobile terminal from at least one content provider server. Media flow information related to a media flow is received from at least one content provider server, and the received media flow information is sent to a broadcast/multicast service (BCMCS) controller. Broadcast/multicast service session information to establish a broadcast/multicast service session generated based on the media flow information of the broadcast/multicast service controller, is received, and the context of a corresponding broadcast/multicast service session is generated based on the received media flow information, multicast service session information and MPCS information. The generated context of the broadcast/multicast service session is then sent respectively to at least one content provider server, at least one mobile terminal and the broadcast/multicast service controller so that the one or more mobile terminals acquires the content media flow through the broadcast/multicast service session.

According to another aspect of the invention, there is provided a method of implementing a multi-party conference service (MPCS) using the broadcast/multicast service of a wireless communications system used for a broadcast/multicast service controller, wherein a content media flow is provided for at least one mobile terminal from at least one content provider server. Media flow-related information which the one or more content provider servers attempt to provide from a conference focus of the MCPS, is received. An initiation procedure is performed based on the media flow information, broadcast/multicast service session information to establish a broadcast/multicast service session is generated, and the generated broadcast/multicast service session-related information is sent to the conference focus. The context of the broadcast/multicast service session from the conference focus generated based on the media flow information, broadcast/multicast service session information and MPCS information which are related to the conference focus are received, and the received context is stored. The media flow from the one or more content provider servers is sent to the one or more mobile terminals by a broadcast or multicast protocol by establishing a broadcast/multicast service session with the one or more mobile terminals.

According to another aspect of the invention, there is provided a method of implementing a multi-party conference service (MPCS) by using broadcast/multicast service of a wireless communications system used for a content provider server of an MPCS, wherein the content media flow is provided from the one or more content provider servers to the one or mobile terminals. Media flow information related to a transmission standby media flow is sent to the conference focus of the MPCS. An IP address and a port number of the broadcast/multicast service content server are received from the conference focus. The context of the broadcast/multicast service session generated based on the media flow-related information of the conference focus, broadcast/multicast service session-related information generated by the broadcast/multicast service controller and MPCS-related information are received from the conference focus, and the received context is stored. The media flow is then sent to the one or more mobile terminals via the broadcast/multicast service content server based on the IP address and port number of the broadcast/multicast service content server.

According to another aspect of the invention, there is provided a method of implementing a multi-party conference service (MPCS) by using a broadcast/multicast service used for a mobile terminal of a wireless communications system, wherein a content media flow is provided for at least one content provider server for at least one mobile terminal. Media flow information related to a transmission standby media flow and broadcast/multicast service session-related information generated by a broadcast/multicast service controller are received from the conference focus. The context of the broadcast/multicast service session generated based on the media flow-related information of the conference focus, and broadcast/multicast service session-related information and MPCS-related information is received from the conference focus, and the received context is saved. A broadcast/multicast service session is then established, and the media flow is received via the broadcast/multicast service.

According to another aspect of the invention, there is provided a conference focus of a multi-party conference service (MPCS) which supports offering of the MPCS by using the broadcast/multicast service of a wireless communications system, comprising a signal transmission/reception module which sends or receives a signal of the MPCS, a conference focus module which receives a signal from the signal transmission/reception module or sends a signal via the signal transmission/reception module, and performs management and maintenance of the conference based on the group policy and media policy of the MPCS conference, a context handling module of a broadcast/multicast service session which receives information from the conference focus, and performs initiation, modification or terminating of the context of the broadcast/multicast service session corresponding to the received information, or sends information related to the context of the broadcast/multicast service session to the conference focus, in which the conference focus controls the corresponding broadcast/multicast service session based on the state of the context of the broadcast/multicast service session of the context handling module of the broadcast/multicast service session.

According to another aspect of the invention, there is provided a broadcast/multicast service controller of a wireless communications system which supports a multi-party conference service (MPCS) and comprises a signal transmission/reception module which sends or receives a signal of MPCS, a broadcast/multicast service control module which receives a signal from the signal transmission/reception module, or sends a signal via the signal transmission/reception module, and manages and maintains a broadcast/multicast service session, and a context handling module of a broadcast/multicast service session which receives context from the broadcast/multicast service control module, and performs storing, modification or terminating of the context of the broadcast/multicast service session, or sends information related to the context of the broadcast/multicast service session to the broadcast/multicast service control module, in which the broadcast/multicast service control module controls the corresponding broadcast/multicast service session based on the state of the context of the broadcast/multicast service session.

According to another aspect of the invention, there is provided a content provider server of a multi-party conference service (MPCS) which provides a content media flow for at least one mobile terminal by using a broadcast/multicast service of a wireless communications system, and comprises a signal transmission/reception module which sends or receives a signal of the MPCS, a content providing module which receives a signal from the signal transmission/reception module or sends a signal via the signal transmission/reception module, and provides content media flow, and a context handling module of a broadcast/multicast service session which receives information from the content providing module, and performs initiation, modification or terminating of the context of the broadcast/multicast service session or sends information related to the context of the broadcast/multicast service session to the content providing module, in which the content providing module provides the media flow via a broadcast/multicast service.

According to another aspect of the invention, there is provided a mobile terminal of a wireless communications system which is provided with a multi-party conference service (MPCS) via a broadcast/multicast service, and comprises a signal transmission/reception module which sends or receives a signal of the MPCS, a mobile terminal module which receives a signal from the signal transmission/reception module, or sends a signal via the signal transmission/reception module and can a establish broadcast/multicast service session, a context handling module of a broadcast/multicast service session which receives information from the mobile terminal module, and performs save, modification or terminating of the content of the broadcast/multicast service session, or sends information related to the context of the broadcast/multicast service session to the mobile terminal module, wherein the mobile terminal module controls the corresponding broadcast/multicast service session based on the context state of the broadcast/multicast service session.

According to another aspect of the invention, there is provided a method of implementing a multi-party conference service (MPCS) by using broadcast/multicast service of a wireless communications system, wherein the content media flow is provided from at least one content provider server for at least one mobile terminal. The conference focus of the multi-party conference service receives the media flow information related to a media flow from at least one content provider server, and sends the received media flow information to the broadcast/multicast service controller. The broadcast/multicast service controller generates broadcast/multicast service session information to establish a broadcast/multicast service session based on the media flow-related information, and sends the generated broadcast/multicast service session information to the conference focus. The conference focus generates the context of the corresponding broadcast/multicast service session based on the obtained media flow information, the broadcast/multicast service session information and MPCS information, and sends the context of the broadcast/multicast service session to at least one content provider server, at least one mobile terminal and the broadcast/multicast service controller, respectively. The one or more content provider servers provide the media flow to the broadcast/multicast service content provider servers based on the context of the received broadcast/multicast service session. The one or more mobile terminals and the broadcast/multicast service controller establish a broadcast/multicast service session based on the context of the received broadcast/multicast service session so that the one or more mobile terminals obtain the content media flow content. Further, the conference focus, broadcast/multicast service controller, one or more mobile terminals and one or more content provider servers operate the corresponding broadcast/multicast service session based on the context of the broadcast/multicast service session.

According to yet another aspect of the invention, there is provided a system for implementing a multi-party conference service (MPCS) by using the broadcast/multicast service of a wireless communications system, the system comprising a conference focus of a multi-party conference service, a broadcast/multicast service controller, at least one mobile terminal and at least one content provider server which provides content media flow to the one or more mobile terminals, in which the conference focus, broadcast/multicast service controller, the one or more mobile terminals and the one or more content provider servers respectively comprise a signal transmission/reception module which receives or sends a signal of the multi-party conference service, and a context handling module of a broadcast/multicast service session which processes information related to the context of the broadcast/multicast service session. The conference focus generates the context of a corresponding broadcast/multicast service session in a context handling module of the broadcast/multicast service session based on the media flow information from the one or more content provider servers, the broadcast/multicast service session information from the broadcast/multicast service controller and MPCS information, sends the context of the broadcast/multicast service session to the one or more content provider servers, one or more mobile terminals and the broadcast/multicast service controller respectively via the signal transmission/reception module, and controls the broadcast/multicast service session which provides the content media flow to the mobile terminal based on the context of the broadcast/multicast service session. Further, the broadcast/multicast service controller generates related information to establish a broadcast/multicast service session based on the media flow information from the conference focus, sends the information to the conference focus, receives the context of the broadcast/multicast service session from the conference focus in the context handling module of the broadcast/multicast service session, and stores and maintains the received context so as to control the corresponding broadcast/multicast service session based on the context of the broadcast/multicast service session, the one or more content provider servers provide the media flow information to the conference focus so as to provide the media flow for the one or more mobile terminals via the content server of the broadcast/multicast service session, receive the context of the broadcast/multicast service session from the conference focus in the context handling module of the broadcast/multicast service session, and save and maintain the received context. Further, the one or more mobile terminals receive, the context of the broadcast/multicast service session from the conference focus in the context handling module of the broadcast/multicast service session, store and maintain the received context, operate the corresponding broadcast/multicast service session based on the context of the broadcast/multicast service session, and obtain the content media flow via the broadcast/multicast service session.

BRIEF DESCRIPTION OF THE DRAWINGS

The present invention can be appreciated by the description which follows in conjunction with the following figures, wherein:

FIG. 16 shows an example of SIP INVITE messages of a step 905 in the BCMCS-SC initiation procedure.

FIG. 17 shows an example of SIP UPDATE messages of a step 911 in the BCMCS-SC initiation procedure.

FIG. 18 shows an example of SIP SUBSCRIBE messages of a step 921 in the BCMCS-SC initiation procedure.

FIG. 19 shows an example of SIP NOTIFY messages of a step 921 in the BCMCS-SC initiation procedure.

Figure 1:
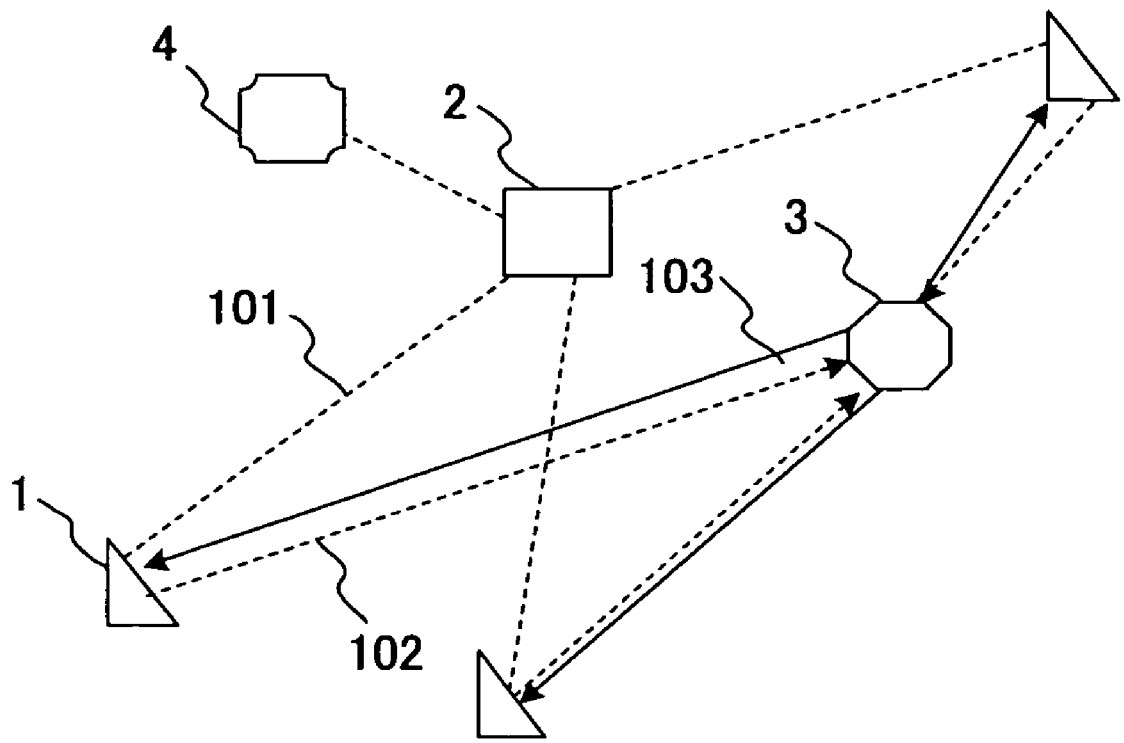
FIG. 1 is a network topology chart of a multiparty conference system provided by the SIPPING working group of IETF.
Figure 2:
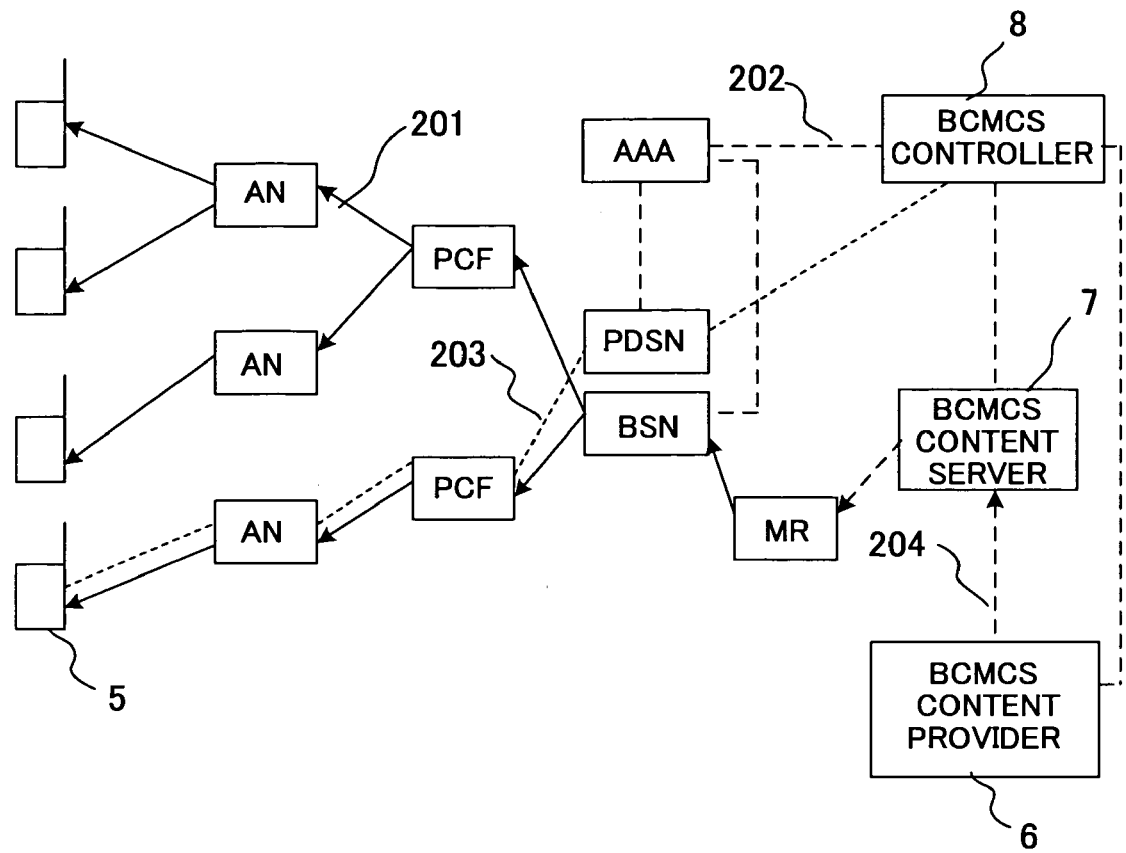
FIG. 2 is a distributed simplified view of a BCMCS system functional entity provided by a 3GPP2 organization.

Hereafter, the invention will be described referring to the drawings and the content of the claims. Other objects and the effects of this invention will become apparent from the further understanding of the whole of the invention.

DETAILED DESCRIPTION OF THE PREFERRED EMBODIMENTS

Hereafter, an embodiment of this invention will be described in detail referring to the drawings.

Here, the invention is described taking only the example of the situation in which MPCS is supported by using SIP in a CDMA 2000 Network.

At least one member user can receive a media flow by using BCMCS technology with the CDMA 2000 mobile terminal member group of a MPCS. At least one member (who is referred to also as a content provider server) provides the media flow for the mobile terminal.

This embodiment of the invention is mainly intended for a densely connected MPCS, but by enhancing this embodiment of the invention, it can support also a loosely connected MPCS or a completely distributed type MPCS.

Hereafter, to simply the description, devices or processes which are irrelevant to the invention will be omitted or simplified. For example, since the conference focus of the MPCS may be connected to other conference group policy control entities and media policy control entities, and these entities are irrelevant to this invention, they are not shown in the drawings below. In addition, since this invention relates only to some BCMCS entities such as, e.g., the BCMCS controller 8 and BCMCS mobile terminal 5, other BCMCS entities are not described by this embodiment.

According to this invention, since BCMCS and MPCS have independent application layer processes respectively, it is required to establish a mapping relation between BCMCS and MPCS, design a related work flow, maintain such a mapping relation and achieve a seamless link between BCMCS technology and MPCS.

In this invention, the mapping relation between BCMCS and MPCS is displayed by a newly defined session context referred to as a BCMCS session context (BCMCS-SC). The functional unit which processes the BCMCS-SC added to the related device is referred to as the BCMCS-SC handling module.

Figure 3:
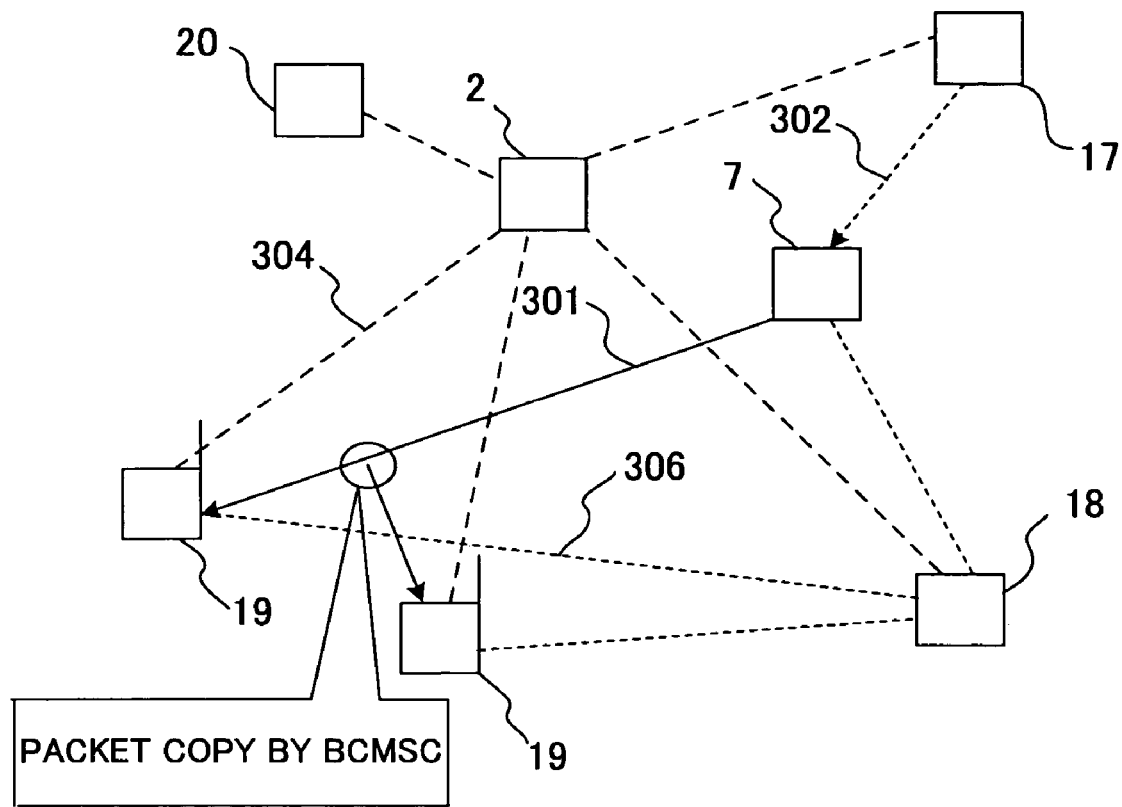
FIG. 3 is a schematic view of a network based on an embodiment of the invention where a multi-party conferencing system is combined with a BCMCS system.

FIG. 3 is a simplified network view where the multi-party conferencing system based on this embodiment of the invention is integrated with a BCMCS system.

Compared with the MPCS system shown in FIG. 1, in the MPCS system of this invention, a new BCMCS-SC handling module and SIP user agent (UA) module replace the corresponding device of the prior art. A new device to control the BCMCS session is also provided.

To be specific, a conventional conference focus 4 is replaced by a new conference focus 20, a member user 1 is replaced by a new mobile terminal 19, a media server 3 is replaced by a BCMCS content server 7, and a new SIP UA content provider server 17 and new BCMCS controller 18 are added. The specific module block of these new devices is described in detail in FIG. 4.

The conference focus 20 manages and maintains signal relations between the BCMCS controller 18, mobile terminal 19 and SIP UA content provider server 17 by a SIP signal 304 in FIG. 3. The BCMCS controller 18 can forward a media flow from the SIP UA content provider server (forwarded via a path 302) to the mobile terminal 19 by a broadcast or multicast method (path 301) by managing and maintaining the mobile terminal 19 and the established BCMCS session by a BCMCS signal 306.

Since the down-link of the SIP UA content provider server 17 and the up-link of the mobile terminal 19 are irrelevant to this invention, these two links are omitted in FIG. 3.

To implement the MPCS system integrated with the BCMC shown in FIG. 3, it is most important to establish a matching relation between the BCMCS and MPCS, i.e., BCMCS-SC.

In this embodiment of the invention, BCMCS-SC has been specifically established for a certain kind of member user in the MPCS environment. All member users of this kind provide media flow for at least one CDMA 2000 member user of the MPCS.

In this embodiment of the invention, a member user (referred to also as content provider server) who provides the media flow for the member user of the CDMA 2000 terminal, is referred to as a SIP UA content provider server (i.e., the entity 17 of FIG. 3).

In actual implementation, however, one CDMA 2000 member user of the MPCS can simultaneously have the functions of the mobile terminal 19 and SIP UA content provider server 17. In other words, in the MPCS, one CDMA 2000 member user may send the media flow to a service group, or may receive the media flow via the BCMCS.

In this embodiment of the invention, BCMCS-SC respectively corresponds to each SIP UA content provider server on a one-to-one basis.

All the BCMCS-SC each has one identifier (ID). This ID is identical to the SIP URI of the corresponding SIP UA content provider server 17.

For example, when the SIP URI of one SIP UA content provider server is SIP:A@aa.com, the ID of the corresponding BCMCS-SC is SIP:A@aa.com.

However, this invention is not limited thereto, and the BCMCS-SC may be identified using another method.

The following items are always required content in a BCMCS-SC which is based on this embodiment of the invention.

M1: BCMCS-SC ID (unique identifier of BCMCS-SC)

M2: IP address of SIP UA content provider server 17 (may be IPv4 or IPv6 address)

M3: Number of BCMCS member users

M4: BCMCS member user SIP URI table (identifier of BCMCS member user)

M5: session identifier (encoding specification of media flow sent by SIP UA content provider server 17)

M6: BCMCS_FLOW_ID (indicator which identifies a BCMCS IP multicast flow, i.e., identifier of BCMCS media flow)

M7: Specific time information (start time of media flow and time length of media flow sent by UA content provider server 17)

M8: Related QoS information (required band, etc.)

M9: Conference ID (identifier related to MPCS).

The following items are selectable content in a BCMCS-SC based on this embodiment of the invention.

01: Address of BCMCS controller 18 (the service provider allocates the address, so the conference focus 20 can acquire the address of the BCMCS controller 18 beforehand. If the conference focus acquires the address of the BCMCS controller 18 by the discovery mechanism of another BCMCS controller 18, this item is a required item in the BCMCS-SC session context).

02: Program name (name of program provided by SIP UA content provider server 17)

03: Security information (if the encryption mechanism of the application layer is used, this item is a required item in the BCMCS-SC session context).

04: Program ID (program identifier provided by the SIP UA content provider server 17).

05: Name of SIP UA content provider server 17 (name corresponds to SIP UA content provider server on a one-to-one basis).

06: Multicast IP address and port number (this uniquely corresponds to the BCMCS_FLOW_ID).

07: Maximum, permissible number of BCMCS member users

08: Other service information defined by the operator or content provider.

The aforesaid BCMCS-SC contents are saved and maintained by the BCMCS-SC handling module based on this invention. As already described, each of the devices newly installed in FIG. 3 each comprise one BCMCS-SC handling module, and the specific module block diagram of these new devices is shown in FIG. 4.

Figure 4:
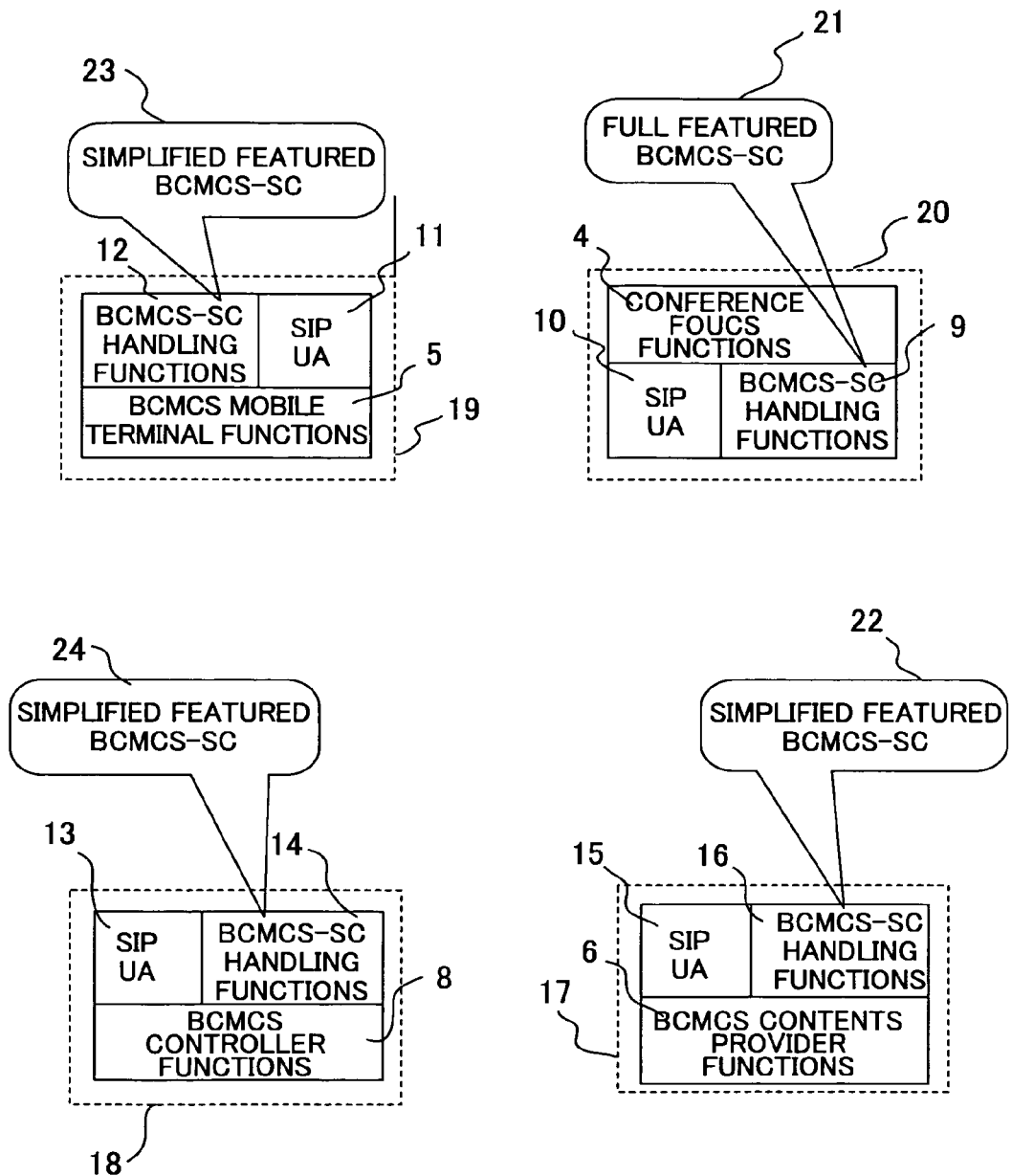
FIG. 4 is a block diagram of an internal module of a conference focus, BCMCS controller, SIP UA content provider server and mobile terminal based on an embodiment of the invention.

As shown in FIG. 4, the BCMCS-SC handling modules 9, 12, 14, 16 and SIP user agent modules 10, 11, 13, 15 are provided to the prior art conference focus 4, BCMCS mobile terminal 5, BCMCS controller 8 and BCMCS content provider server 6. Hence, the new devices of this embodiment are the conference focus 20 provided with the BCMCS-SC handling module, the SIP mobile terminal 9 provided with the BCMCS-SC handling module, the SIP BCMCS controller 18 provided with the BCMCS-SC handling module and the SIP UA content provider server 17 provided with the BCMCS-SC handling module.

In these newly provided devices, the conference focus 20 must manage and maintain signaling relations between all conference members, so the BCMCS-SC handling modules must maintain the contents of all the BCMCS-SC, i.e., the BCMCS-SC handling modules in the conference focus 20 establish BCMCS-SC with all attributes. As for the BCMCS-SC handling modules of other new devices, they need to maintain only the contents of BCMCS-SC related to the present devices, i.e., only BCMCS-SC with partial attributes are saved.

The contents of these BCMCS-SC must coincide with the contents of the BCMCS-SC maintained by the conference focus 20. Therefore, in addition to the BCMCS-SC handling module, as shown in FIG. 4, SIP user agent modules for exchanging information related to the conference focus 20 and BCMCS-SC via SIP signaling are added to all related devices of the invention (conference focus 20, mobile terminal 19, BCMCS controller 18 and SIP UA content provider server 17). In other words, the SIP UA of each new device is actually a signal transmission/reception module.

It should also be noted that in all these new devices in which a BCMCS-SC handling module is provided, all operations related to the BCMCS of MPCS performed by the functional modules 4, 5, 6 and 8 must respectively be based on the state of the BCMCS-SC.

In this embodiment of the invention, the processing performed on the BCMCS-SC of the BCMCS-SC handling module is divided into three procedures, i.e., initiation, modification and terminating of the BCMCS-SC. Hereafter, the operating procedure of the BCMCS-SC handling module will be described referring to FIG. 5 to FIG. 7 taking the BCMCS-SC handling module 9 as an example.

Figure 5:
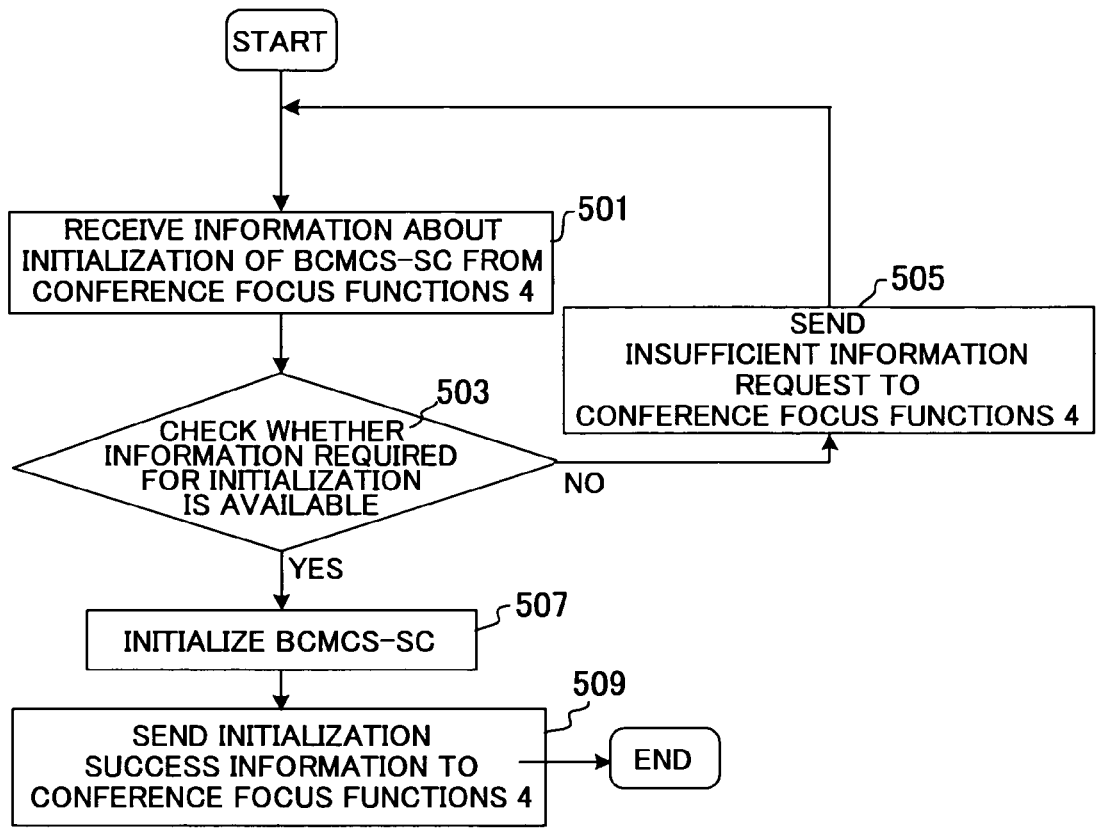
FIG. 5 is a flow chart showing BCMCS-SC operation in a conference focus handling module in a BCMCS-SC initiation procedure.

FIG. 5 is a flow chart of the operation of the BCMCS-SC handling module 9 in the conference focus 20 in the initiation procedure of the BCMCS-SC. First, the conference focus module 4 receives information about the initiation of the BCMCS-SC, and sends this to the BCMCS-SC handling module 9. In this way, in a step 501, the BCMCS-SC handling module 9 receives information on the initiation of the BCMCS-SC.

Next, the BCMCS-SC handling module 9 checks whether all required contents (e.g., the required contents M1 to M9 of the BCMCS-SC) needed for the initiation of the BCMCS-SC were received (step 503). When part of the required contents is insufficient, a request is sent to the conference focus module 4 for the insufficient information (step 505). On the other hand, when it is confirmed that sufficient information has been obtained in the step 503, the BCMCS-SC handling module 9 establishes the BCMCS-SC (step 507), and sends confirmation information to the conference focus module 4 (step 509) to the effect that initiation of the BCMCS-SC was successful.

Figure 6:
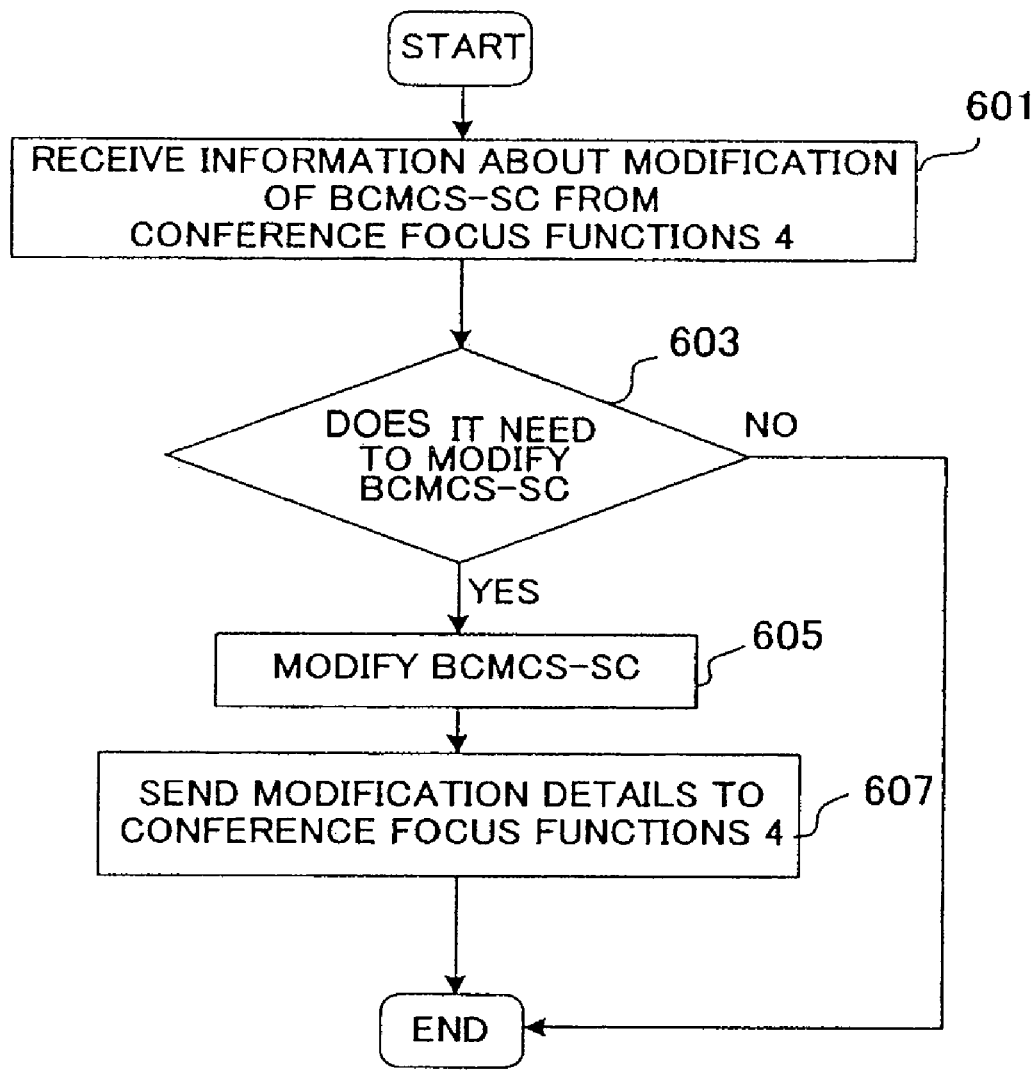
FIG. 6 is a flow chart showing BCMCS-SC operation in a conference focus handling module in a BCMCS-SC modification procedure.

FIG. 6 is a flow chart of the operation of the BCMCS-SC handling module 9 in the conference focus 20 in the modification procedure of the BCMCS-SC.

First, the conference focus module 4 receives information about the modification of the BCMCS-SC, and this is sent to the BCMCS-SC handling module 9. In this way, in a step 601, the BCMCS-SC handling module 9 receives information about the modification of the BCMCS-SC.

Next, in a step 603, the BCMCS-SC handling module 9 checks whether or not the contents of the BCMCS-SC should be modified. When it is not necessary to modify it, no operation is performed and the modification procedure is terminated.

On the other hand, if it is necessary to modify it, the BCMCS-SC handling module 9 modifies the BCMCS-SC saved internally (step 605), and sends the modified content to the conference focus module 4 (step 607). Finally, the conference focus module 4 performs a related session modification operation based on feedback modification information.

Figure 7:
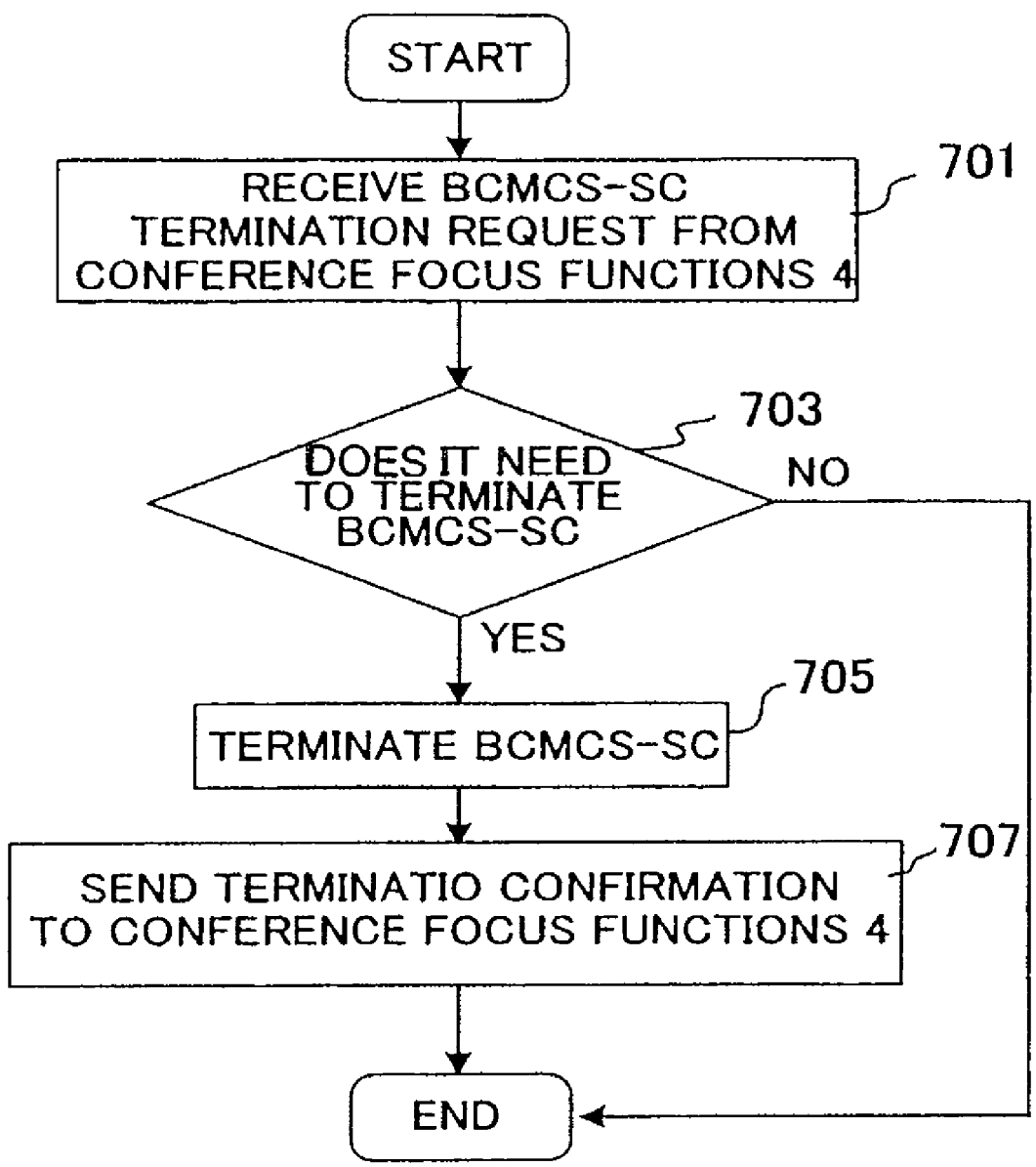
FIG. 7 is a flow chart showing BCMCS-SC operation in a conference focus handling module in a BCMCS-SC terminating procedure.

FIG. 7 is a flow chart of the operation of the BCMCS-SC handling module 9 in the terminating procedure of the BCMCS-SC.

First, the conference focus module 4 receives information about the terminating of the BCMCS-SC, and a BCMCS-SC terminating request is sent to the BCMCS-SC handling module 9. Hence, in a step 701, the BCMCS-SC handling module 9 receives the BCMCS-SC terminating request.

Next, the BCMCS-SC handling module 9 checks whether or not the BCMCS-SC should be terminated (step 703). If the BCMCS-SC need not be terminated, no operation is performed and the stop procedure is terminated. On the other hand, if it is necessary to stop the BCMCS-SC, the BCMCS-SC is terminated by the BCMCS-SC handling module 9 (step 705), and stop confirmation information is sent to the conference focus module 4 (step 707). Finally, the conference focus module 4 performs a related session terminating operation.

The flow chart of the operation of the BCMCS-SC handling modules 12, 14, 16 of the mobile terminal 19, BCMCS controller 18 and SIP UA content provider server 17 is similar to the flow charts of the operation of the BCMCS-SC handling module 9 described in FIG. 5, FIG. 6 and FIG. 7. For example, if the conference focus module 4 and BCMCS-SC handling module 9 of FIG. 5, FIG. 6 and FIG. 7 are replaced by the BCMCS mobile terminal module 5 and BCMCS-SC handling module 12 which correspond respectively thereto, the flow chart of the operation of the BCMCS-SC handling module of the mobile terminal 19 is obtained.

In this invention, the role of the BCMCS-SC is to establish a mapping relation between MPCS and BCMCS, to support the conference focus 20, and to complete the initiation, modification and terminating operations of the session related to the BCMC. In the MPCS, when the BCMCS-SC is initialized, the mobile terminal 19 must first receive some initiation information about the BCMCS for the initiation task of the BCMCS session. This information includes the BCMCS_FLOW_ID, specific time information and othersome program-related information.

The BCMCS controller 18 must also receive some information about the initiation task (session descriptor, specific time information, QoS parameters and security information). This information can be acquired from the SIP AU content provider server 17 via the conference focus 20. The conference focus 20 also determines whether to modify or to terminate the BCMCS session which is related in some way based on the state of the BCMCS-SC.

Therefore, it can be understood that the role of the BCMCS-SC is that of an agent of the related BCMCS session in the conference focus 20. The conference focus 20 implements the operation of the BCMCS session, and implements the mapping relation of the BCMCS and MPCS with the cooperation of the agent.

Here, let the Call Session Control Function (CSCF) under the MMD frame using 3GPP2 be the SIP server 2. FIG. 8, FIG. 9, FIG. 10, FIG. 11, FIG. 12, FIG. 13, FIG. 14 and FIG. 15 show the operation procedure of the BCMCS-SC which supports the compilation of the BCMCS and MPCS. Hereafter, these will be described in detail. The new information content and service forwarded in the new MPCS entity will now also be described in detail.

In the following descriptions, the SIP URI of the SIP UA content provider server 17 is SIP:A@aa.com, the SIP URI of the mobile terminal 19 is SIP:B@bb.com, the SIP URI of the BCMCS controller 18 is SIP:BC@xx.com, and the SIP URI in the conference focus 20 is SIP:Conf_ID@conf.com. In practice, the CDMA 2000 member user in one MPCS can support the mobile terminal 19 and SIP UA content provider server 17 simultaneously. In other words, one CDMA 2000 member user can send and receive the media flows related to the MPCS simultaneously.

(BCMCS-SC Initiation Step)

Figure 8:
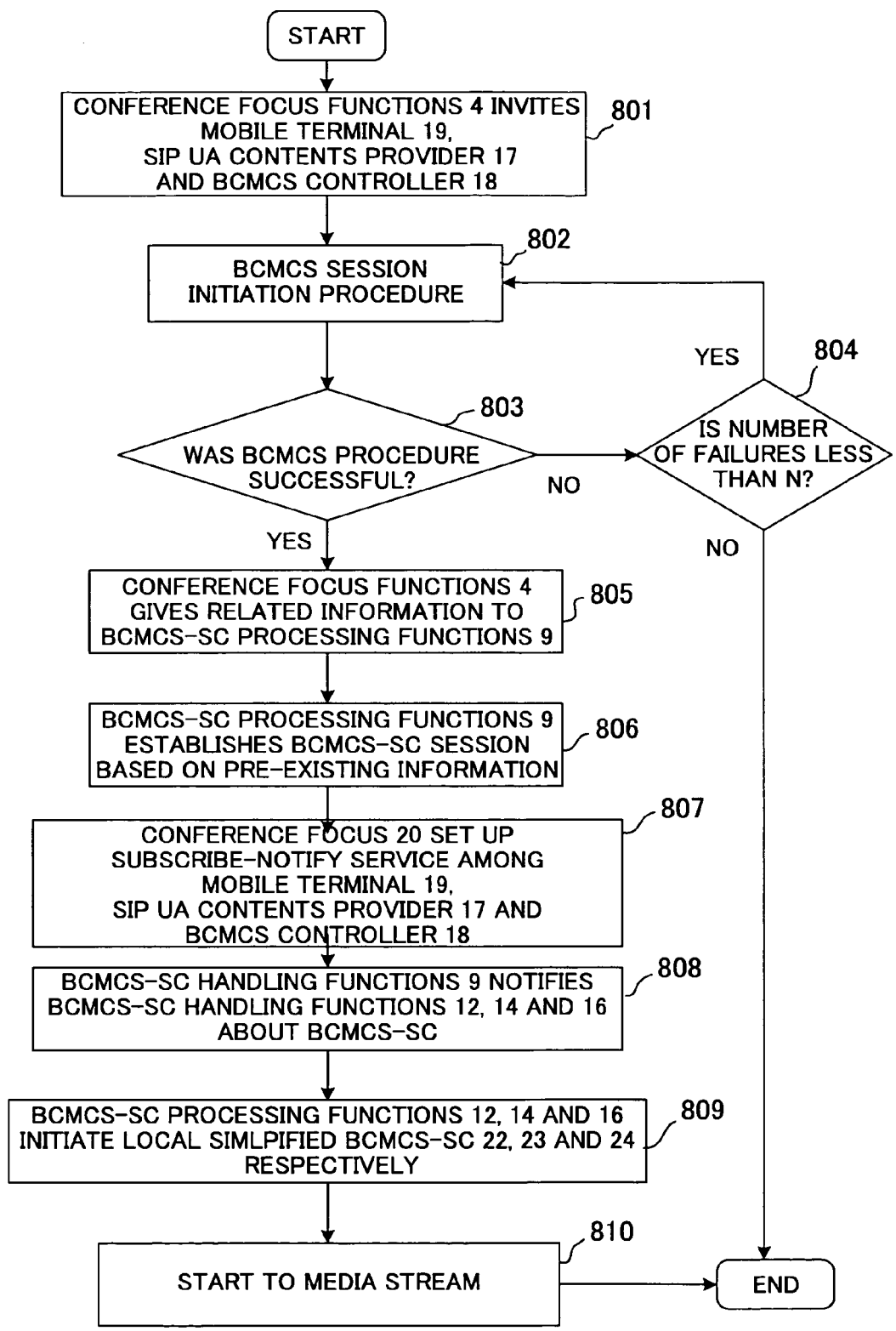
FIG. 8 is a flow chart showing a BCMCS-SC initiation procedure operation.

FIG. 8 is a flow chart of the operation of related devices in the initiation procedure of the BCMCS-SC of this invention.

As shown in FIG. 8, the conference focus 20 sends an INVITE message to the related MPCS and BCMCS devices (step 801). These devices include the mobile terminal 19, BCMCS controller 18 and SIP UA content provider server 17.

Next, in a step 802, the mobile terminal 19, BCMCS controller 18 and SIP UA content provider server 17 start execution of the initiation procedure of the BCMCS session based on the information received by each. The conference focus 20 determines whether or not the initiation of the BCMCS session was successful based on the received information from the related devices (step 803). If the initiation of the BCMCS session fails, and the number of failures is smaller than a predetermined value N (step 804), the initiation of the BCMCS session is repeated. Otherwise, the BCMCS-SC initiation procedure is terminated.

If the initiation of the BCMCS session was successful, in the conference focus 20, the BCMCS-SC handling module 9 receives related information from the prior art conference focus module 4 (step 805), and establishes one corresponding BCMCS-SC 21 with all attributes (step 806).

After completing the establishment of the BCMCS-SC 21, in a step 807, the conference focus 20 establishes a SIP SUBSCRIBE-NOTIFY service via the related devices (mobile terminal 19, BCMCS controller 18 and SIP UA content provider server 17), and forwards the BCMCS-SC. Therefore, an event packet including the BCMCS-SC information is newly added to the SIP SUBSCRIBE-NOTIFY service.

Next, after receiving a notification related to the content of the BCMCS-SC (step 808), the BCMCS-SC handling modules 12, 14 and 16 of the related devices can establish the BCMCS-SC 22, 23 and 24 with local, partial attributes in the corresponding devices (step 809).

Finally, forwarding of the media flow starts in a step 810.

Figure 9:
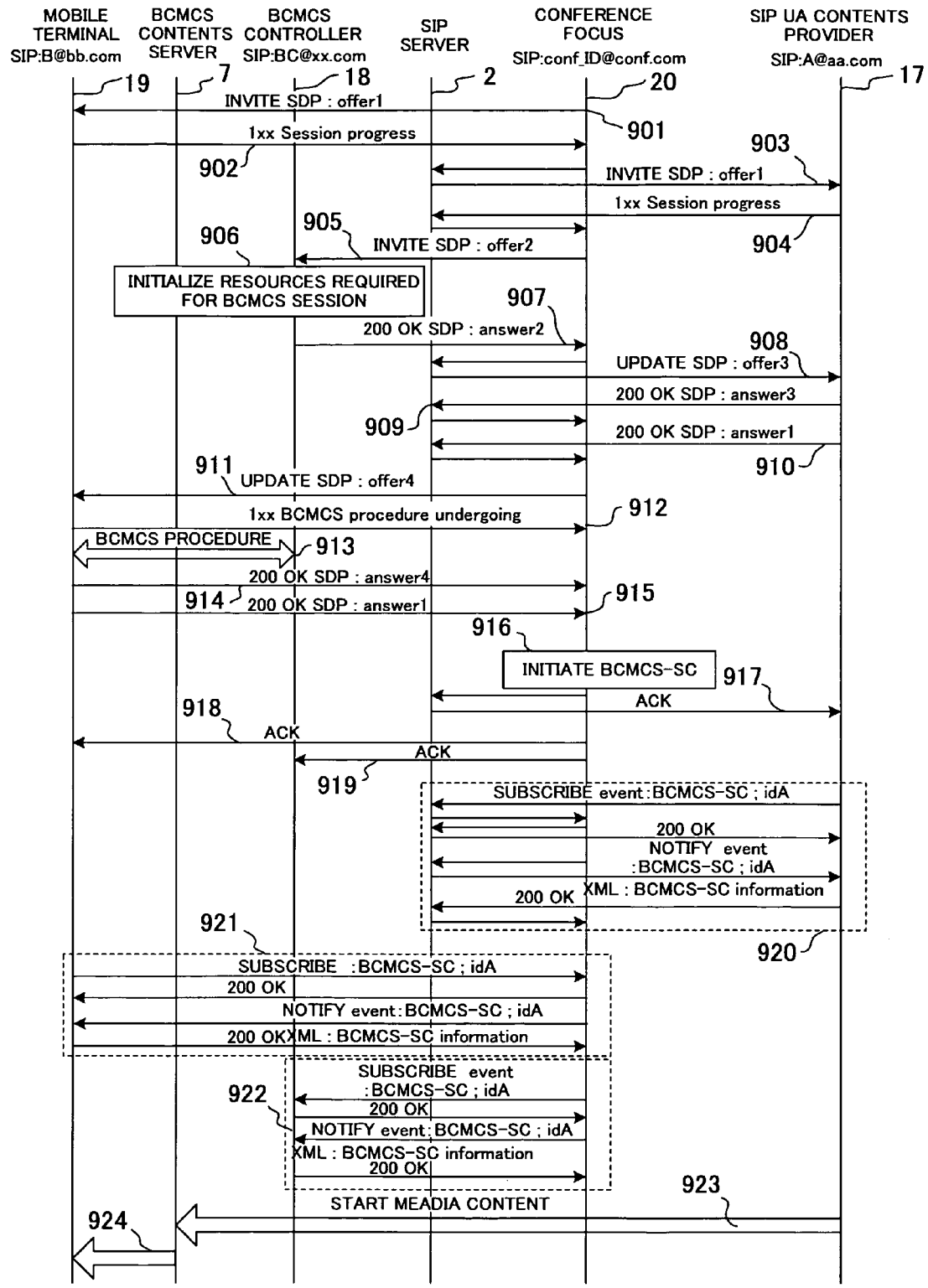
FIG. 9 is a flow chart of SIP messages of the BCMCS-SC initiation procedure.

FIG. 9 is a specific SIP message flow chart of the initiation procedure of the BCMCS-SC shown in FIG. 8.

As shown in FIG. 9, first, the conference focus 20 sends an INVITE message in SIP signal to the mobile terminal 19 and SIP UA content provider server 17 (steps 901 and 903). Among this, the session description protocol (SDP) of the INVITE message contains a request message body offer 1, so information related to the initiation of MPCS can be forwarded.

Subsequently, the users of related devices who receive the INVITE message, respectively send the response message "1xx session in progress" (steps 902 and 904). In a step 904, the SIP UA content provider server 17 adds, e.g., a session description, specific time information and QoS parameters, or security information, program name and selectable, required BCMCS-SC-related information such as the name of the SIP UA content provider server 17, to the response message.

Thus, the conference focus 20 sends the INVITE message to the BCMCS controller 18 based on information provided by the SIP UA content provider server 17 (step 905). A request message body offer 2 contained in the SDP of the INVITE message contains specific time information, QoS parameters (if the application layer is encrypted, security information must be included) provided by the SIP UA content provider server 17, and other selectable, related information.

FIG. 16 shows an example of the SIP INVITE message of the step 905.

There is a possibility that after the BCMCS controller 18 receives the message included in the offer 2, it may trigger security recognition information, but this is not shown in the drawing. Also, the BCMCS control unit (not shown) of the BCMCS controller 18 must initiate some resources to generate information related to the program ID, BCMCS_FLOW_ID, multicast IP address, port number, program information and BCMCS-SC.

For the BCMCS controller 18, the content related to the BCMCS-SC, BCMCS-SC ID, program ID, BCMCS_FLOW_ID and related QoS parameters are included (if the application layer is encrypted, security information is included) (step 906). Next, after the BCMCS controller 18 completes initiation of the resources required for the BCMCS session, a 200 OK response, which is an acknowledgment of the INVITE message of the step 905, is sent to the conference focus 20 (step 907), and a response message body answer 2 included in the SDP of the message is taken as a response to the offer 2 in the step 905.

The response message body answer 2 must include the related BCMCS_FLOW_ID, and the IP address and port number (receives the media flow sent from the SIP UA content provider server 17) of the BCMCS content server 7, and may include selectable information such as a multicast IP address, port number, program information and program ID.

The conference focus 20 then sends an UPDATE message of SIP message to the SIP UA content provider server 17 (step 908). A message offer 3 includes the IP address and port number of the BCMCS content server 7, and the SIP UA content provider server 17 sends the media flow to the BCMCS content server 7.

The SIP UA content provider server 17 sends a 200 OK response (step 909), and changes of the QoS parameters and other information updates can be provided in this response message. The 200 OK message can be sent as a response to the INVITE message of the step 903 (step 910).

Next, the conference focus 20 sends the UPDATE message to the mobile terminal 19 (step 911). A request message body offer 4 of the message must include information related to the BCMCS contents (e.g., BCMCS_FLOW_ID, program descriptor, SIP URI of the SIP UA content provider server 17).

FIG. 17 is an example of the SIP UPDATE message of a step 911.

If required, the IP address of the BCMCS controller 18 may be added to the message of the step 911. To establish the BCMCS session, the mobile terminal 19 sends a BCMCS information acquisition based on this information. Before a related BCMCS procedure starts, to inform the conference focus 20 that a BCMCS procedure is being performed, the mobile terminal 19 must also send a "1xx BCMCS procedure in progress" response (step 912).

In this way, the mobile terminal 19 can send the BCMCS session establishment procedure (step 913). The procedure related to the BCMCS is described in detail in the BCMCS standards of the prior art CDMA 2000 system, and its description is omitted here.

If the BCMCS session establishment procedure of the step 913 was successful, the mobile terminal 19 sends the 200 OK response message to the conference focus 20 (step 914), and this is taken as the response to the UPDATE message of the step 911. Next, the 200 OK response message is sent (step 915), and this is taken as the response to the INVITE message of the step 901.

The conference focus 20 generates the BCMCS-SC based on the previously received information (step 916). If all the steps are successful, the conference focus 20 must respectively send a confirmation (ACK) message to the mobile terminal 19, SIP UA content provider server 17 and BCMCS controller 18 (steps 917, 918 and 919). Subsequently, the conference focus 20 establishes a corresponding BCMCS-SC notification service based on the subscriber notification defined in the prior art SIP signaling standards (steps 920, 921 and 922).

FIG. 18 and FIG. 19 are examples of the SUBSCRIBE and NOTIFY messages of the step 921.

One new event package used for the notification service of the BCMCS-SC related flow, named BCMCS-SC, is defined in the SUBSCRIBE and NOTIFY messages. The purpose of the notification service is to exchange status information related to the BCMCS-SC in the related MPCS and BCMCS entities. This event package will be described in detail later.

Finally, after each device acquires all the BCMCS-SC, the SIP UA content provider server 17 sends the initial unicast media flow to the BCMCS content server 7 based on the IP address and port number of the acquired BCMCS content server 7 (step 923).

The BCMCS content server 7 must first perform processing on these contents, and after processing, it sends them to a broadcast serving node, and the mobile terminal 19 acquires the media flow by the broadcast/multicast method via the BCMCS session under the control of the BCMCS controller 18 (step 924).

In the aforesaid initiation process, the BCMCS session is actually sent from the SIP UA content provider server 17 with the cooperation of the conference focus 20 and SIP server 2. The utilization of wireless resources related to the MPCS is decreased by sending the media flow of conference contents to plural mobile terminals by one multicast down-link under the control of the BCMCS controller via the aforesaid initiation procedure.

The step 901 to step 907 correspond to the step 801 in FIG. 8. The step 908 to step 915 correspond to the step 802 to step 804 of FIG. 8. The step 916 corresponds to the step 805 to step 806 of FIG. 8. The step 920 to step 922 correspond to the step 807 to step 809 of FIG. 8. Finally, the step 923 to step 924 corresponds to the step 810 of FIG. 8.

Even when a new mobile terminal 19 subscribes to a MPCS which has already been established, the BCMCS-SC initiation procedure can still be sent. This situation can be supported only by changing the message of the step 903 to re-INVITE.

Next, the definition of the event package related to BCMCS-SC will be described. The role of this event package is to provide a BCMCS-SC notification service. The definition of the event package follows the SIP event package definition method described in RFC3265.

A SUBSCRIBE request related to BCMCS-SC (SUBSCRIBE message) is sent from the related entity to the conference focus 20. The SUBSCRIBE request includes a BCMCS-SC item table to which the entity is related. In this case, the conference focus 20 is the notifying party, and state updating information related to BCMCS-SC is provided to the user terminal via a NOTIFY message. The event package includes a BCMCS-SC ID, and information regarding the SIP UA content provider server 17, mobile terminal 19 and BCMCS controller 18.

The conference focus 20 acquires sufficient information about the BCMCS-SC, and provides this information to the user terminal. The name of the event package is "BCMCS-SC". This name must be contained in the Event header and Allow-Events header of the message related to SIP based on the definition of RFC 3265.

SUBSCRIBE for the BCMCS-SC event package must contain the message body, and the message body defines one filter for the corresponding SUBSCRIBE. If the message body is not contained in one SUBSCRIBE message, the following default filter policy is used. Specifically, a notification message does not need to be generated each time a change occurs in BCMCS-SC. In general, all state contents do not need to be included in the notification message, and only a change state needs to be indicated. For the filter design, reference may be made to RFC 3265, which is not the focus of this invention.

As stated in RFC 3265, the NOTIFY message requires a message body which describes status information of SUBSCRIBE. The specification of the message body should follow the specification for the Accept header of the SUBSCRIBE message. A default specification is adopted when this specification is not defined. All notifying parties (conference focuses 20) and subscribers (mobile terminals 19, BCMCS controllers 18 and SIP UA content provider servers 17) should support the "application/BCMCS-SC+xml" data specification as the default message body specification.

When a definition for the specification exists in the SUBSCRIBE message, the "application/BCMCS-SC+xml" specification must also be included therein.

Whenever the mobile terminal 19 joins or leaves a BCMCS session related to the BCMCS-SC, it must send a notification message to report the state of the BCMCS-SC. Whenever a change occurs to a message required by the BCMCS-SC, a notification message must be sent to report the state of the BCMCS-SC. Also, even when a change occurs to a message which can select the BCMCS-SC, a notification message must be sent to report the state of the BCMCS-SC.

The root element of the BCMCS-SC XML file is <BCMCS-SC>, and the type is BCMCS-SC-type. The BCMCS-SC type may be an entity attribute which can identify the corresponding BSMCS-SC which is a BCMCS-SC ID, or it may be a state attribute which indicates whether or not all BCMCS-SC messages are contained in the XML file (full, partial or deleted (the BCMCS will soon terminate)).

The detailed message must contain the relevant standards (e.g., RF 3265), and a version attribute which identifies the transmission sequence of the XML file (add 1 each time it is updated counting from zero. This attribute is defined in RCFC 3265).

The BCMCS-SC-type defines an extensible sub-element.

The BCMCS-SC XML file for the "full" attribute must include at least <BCMCS-SC-description> (BCMCS-SC-description-type), <SIP-UA-content-provider-info> SIP-UA-content-provider-type), <BCMCS-SC-state-info> (BCMCS-SC-state-type), and <BCMCS-Users-Info> (BCMCS-SC-Users-type).

Among these, <BCMCS-SC-description> (BCMCS-SC-description-type) contains service allocation information prior to establishment of the BCMCS-SC. In MPCS, once this information is set, it is hardly ever updated. In the BCMCS-SC items, M1, M2, M3 and M9 belong to this type, and if O5, O6, O7 and O8 exist, they belong to this type.

<SIP-UA-content-provider-info> SIP-UA-content-provider-type) includes information which describes the state of the SIP UA content provider server 17 corresponding to the BCMCS-SC. This information is originally set when the BCMCS-SC is established, and can be changed by the SIP UA content provider server 17 during the service period. In the BCMCS-SC items, M1, M2, M3 and M9 belong to this type, and if O5, O6, O7 and O8 exist, they belong to this type.

<BCMCS-SC-state-info> (BCMCS-SC-state-type) includes information which describes the movement of a given state of the BCMCS-SC. This information is originally set when the BCMCS-SC is established, and can be changed during the service period. In the BCMCS items, M3 corresponds to this type. The related states are "active", "modifying", "locked", "terminating", or other self-definition states. These states can be auto-set by the service operator.

<BCMCS-Users-Info> (BCMCS-SC-Users-TYPE) can include a fixed or non-fixed number of the sub-elements <BCMCS-SC-User> (user-type), and these user-type describe state information of the mobile terminal 19 of the BCMCS-SC. In the BCMCS-SC items, M4 belongs to the user-type. The service operator may add other information thereto.

This invention is not limited to the types enumerated, and the service operator can add other sub-types to the BCMCS-SC XML file.

A notification identification must be defined for each BCMCS-SC, and here, the notification sign is idA (the corresponding BCMCS-SC is SIP:A@aa.com).

(BCMCS-SC Modification Procedure)

Figure 10:
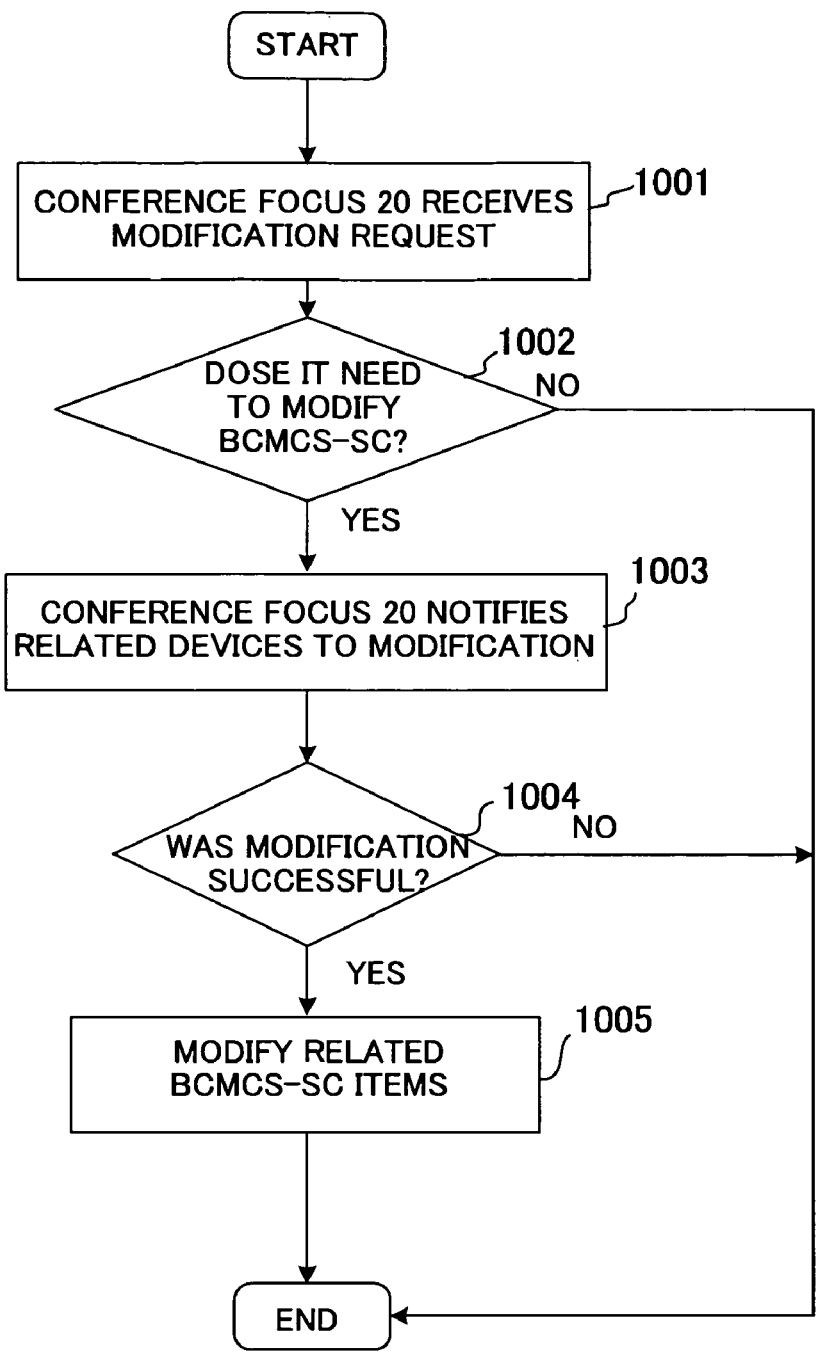
FIG. 10 is a flow chart showing a BCMCS-SC modification procedure operation.

When a new mobile terminal 19 joins a pre-established MPCS, a BCMCS-SC modification procedure can be sent so that the media flow of the broadcast/multicast method is forwarded to this mobile terminal. In addition, a BCMCS-SC modification procedure can be sent in various situations in which the mobile terminal 19 leaves the MPCS or SIP UA content provider server 17 and the session description of the media flow is changed. FIG. 10 shows an operation flow chart of related devices in the BCMCS-SC modification procedure.

As shown in FIG. 10, when it is necessary to modify the BCMCS and related BCMCS session, the conference focus 20 receives a modification request from the MPCS and BCMCS devices in which the mobile terminal 19 and SIP UA content provider server 17 are contained BCMCS-SC (step 1001).

Next, in a step 1002, the BCMCS-SC handling module 9 in the conference focus 20 checks the state of the BCMCS-SC which is currently maintained based on the received information, and determines whether or not a modification is required. When it is confirmed that a modification is required, the conference focus 20, in a step 1003, notifies related devices to modify the session. Next, the conference focus 20 receives a session modification response message from each related device. It is determined whether or not the modification of the session was successful based on the response message (step 1004).

If the modification of the session fails, this modification procedure terminates. If the modification of the session was successful, the BCMCS-SC handling module 9 in the conference focus 20 performs modification of the maintained BCMCS-SC, notifies each related device to modify the BCMCS-SC (step 1005), and thus completes the whole modification procedure.

In many cases, the BCMCS-SC modification procedure can be triggered.

Figure 11:
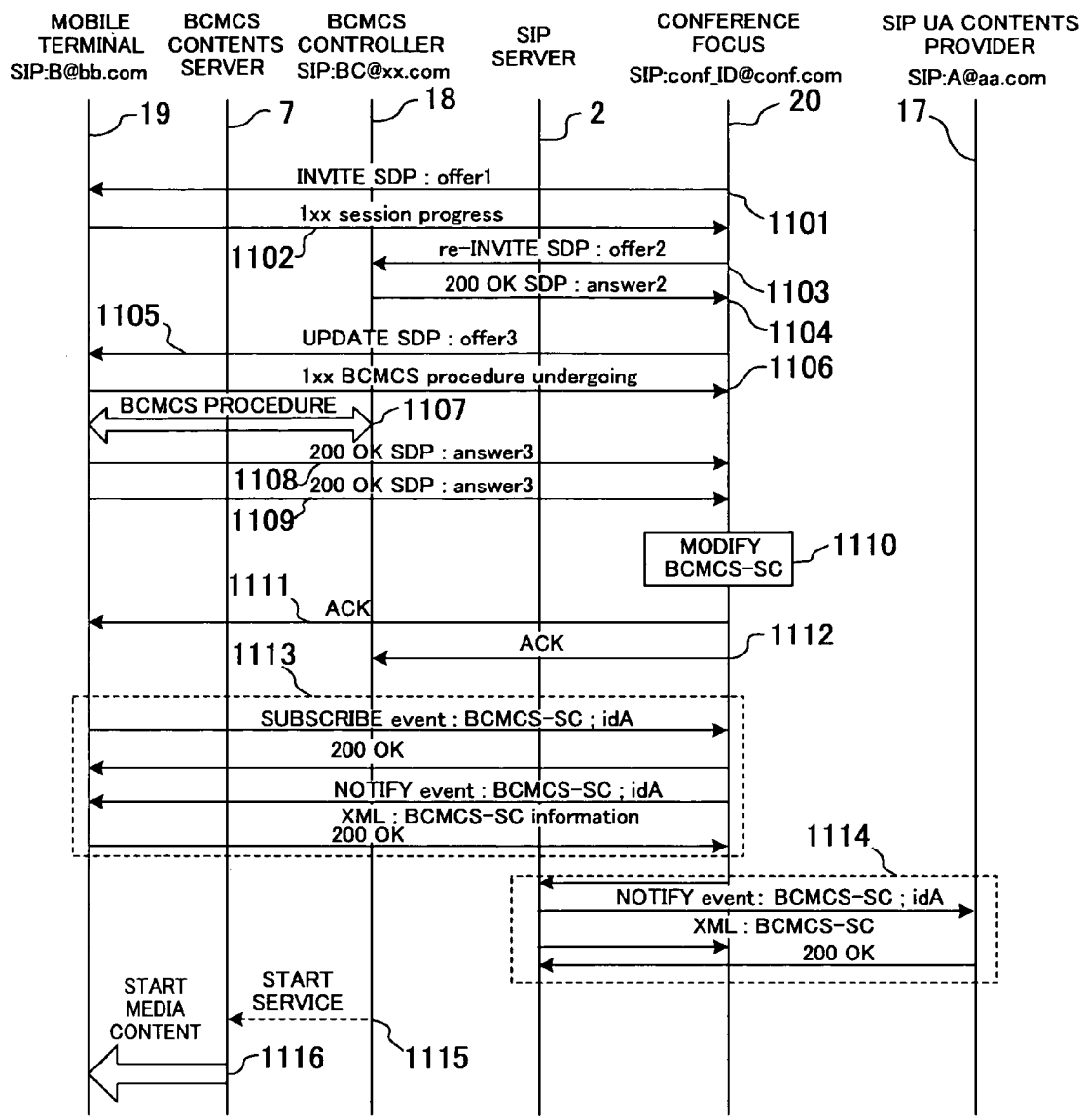
FIG. 11 is a flow chart of SIP messages of the BCMCS-SC modification procedure sent by one mobile terminal.
Figure 12:
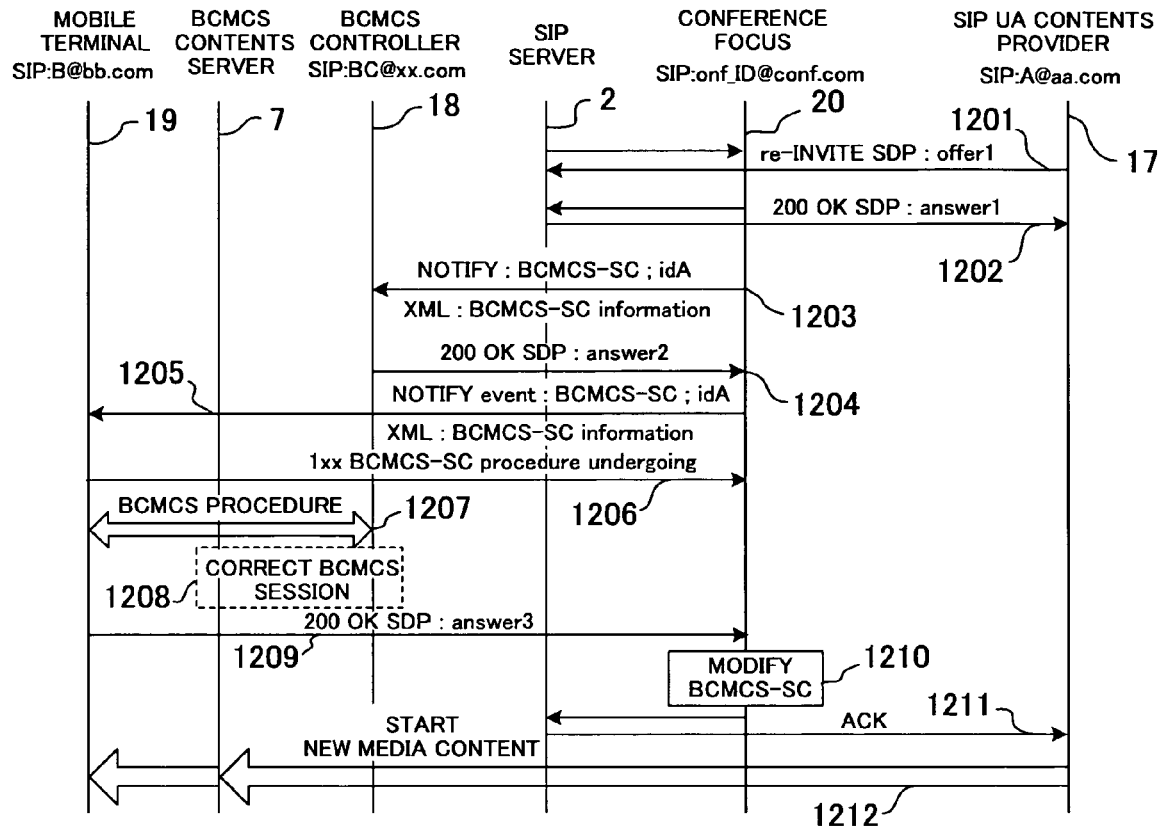
FIG. 12 is a flow chart of SIP messages of the BCMCS-SC modification procedure sent by one SIP UA content provider server.

FIG. 11 and FIG. 12 show the SIP message process of the BCMCS-SC modification procedure which is sent in two cases when a new mobile terminal 19 joins the MPCS and SIP UA content provider server 17, and the media flow session description is updated.

FIG. 11 is a SIP message process modified by the BCMCS-SC sent from a recently subscribed mobile terminal.

As shown in FIG. 11, the conference focus 20 sends an INVITE message, which is identical to the message of the step 901, to the subscriber mobile terminal 19 (step 1101).

Likewise, the mobile terminal 19 sends a 1xx session progress message (step 1102) in response.

Next, the conference focus 20 sends a re-INVITE message to the BCMCS controller 18 (step 1103), and initial information for the BCMCS session provided by the BCMCS controller 18 is acquired from the 200 OK response (step 1104).

In this response message body answer 2, the related BCMCS-FLOW-ID must be included, and selectable information such as the multicast IP address, port number, program information and program ID may also be included.

From a step 1105 to a step 1109, it is a BCMCS-related process which coincides with the step 911 to step 915.

When the conference focus 20 receives the response of the step 1109, it modifies the corresponding BCMCS-SC (step 1110). The conference focus 20 then sends a confirmation (ACK) message to the mobile terminal 19 and the BCMCS controller, respectively (step 1111 and step 1112).

Next, in a step 1113, a SIP subscriber notification service, i.e., a BCMCS-SC notification service, is established between the conference focus 20 and mobile terminal 19 so as to notify the modified BCMCS-SC to the mobile terminal 19. This is identical to the step 921.

The conference focus 20 must further notify a corresponding update message to the SIP UA content provider server 17 via the BCMCS-SC notification service. Finally, in step 1115 and step 1116, the BCMCS controller 18 and BCMCS content server 7 can start forwarding the BCMCS media flow to the mobile terminal 19.

FIG. 12 shows the BCMCS-SC modification process sent from one of the SIP UA content provider servers 17.

As shown in FIG. 12, if there is a change in the media flow-related information provided by the SIP UA content provider server 17 (e.g., a change in the encoding specification), the SIP UA content provider server 17 first sends a re-INVITE message to the conference focus (step 1201). In the request message body offer 1 of the message, updated information about the BCMCS-SC (e.g., specific time information, related QoS parameters, security information, program name and name of the SIP UA content provider server 17) can be included.

Next, the SIP UA content provider server 17 receives a 200 OK response from the conference focus 20 (step 1202). The conference focus 20 then notifies the updated information to the BCMCS controller 18 via the BCMCS-SC notification service (step 1203).

After a 200 OK response is received from the BCMCS controller 18 (step 1204), the conference focus 20 notifies the updated information to the mobile terminal 19 (step 1205).

Next, the mobile terminal 19 sends the establishment procedure for the corresponding BCMCS session. The procedure can be sent according to a re-registration procedure by the BCMCS. The mobile terminal 19 must send the response "1xx BCMCS procedure in progress" so that the conference focus 20 is notified that a BCMCS procedure is in progress before starting the establishment procedure of the related BCMCS session (step 1206).

The mobile terminal 19 performs modification of the related BCMCS session via the BCMCS procedure in a step 1207 (step 1208). The modification procedure for the BCMCS session is described in detail in the relevant BCMCS standards, and its specific description is omitted here.

After the BCMCS session is modified, the mobile terminal 19 sends a 200 OK response to the conference focus 20 (step 1209). The conference focus 20 modifies the corresponding BCMCS-SC after the response is received (step 1210), and sends a modification confirmation (ACK) message to the SIP content provider server (step 1211). The SIP UA content provider server 17 can then start forwarding a new media flow (step 1212).

(Terminating of BCMCS-SC)

Figure 13:
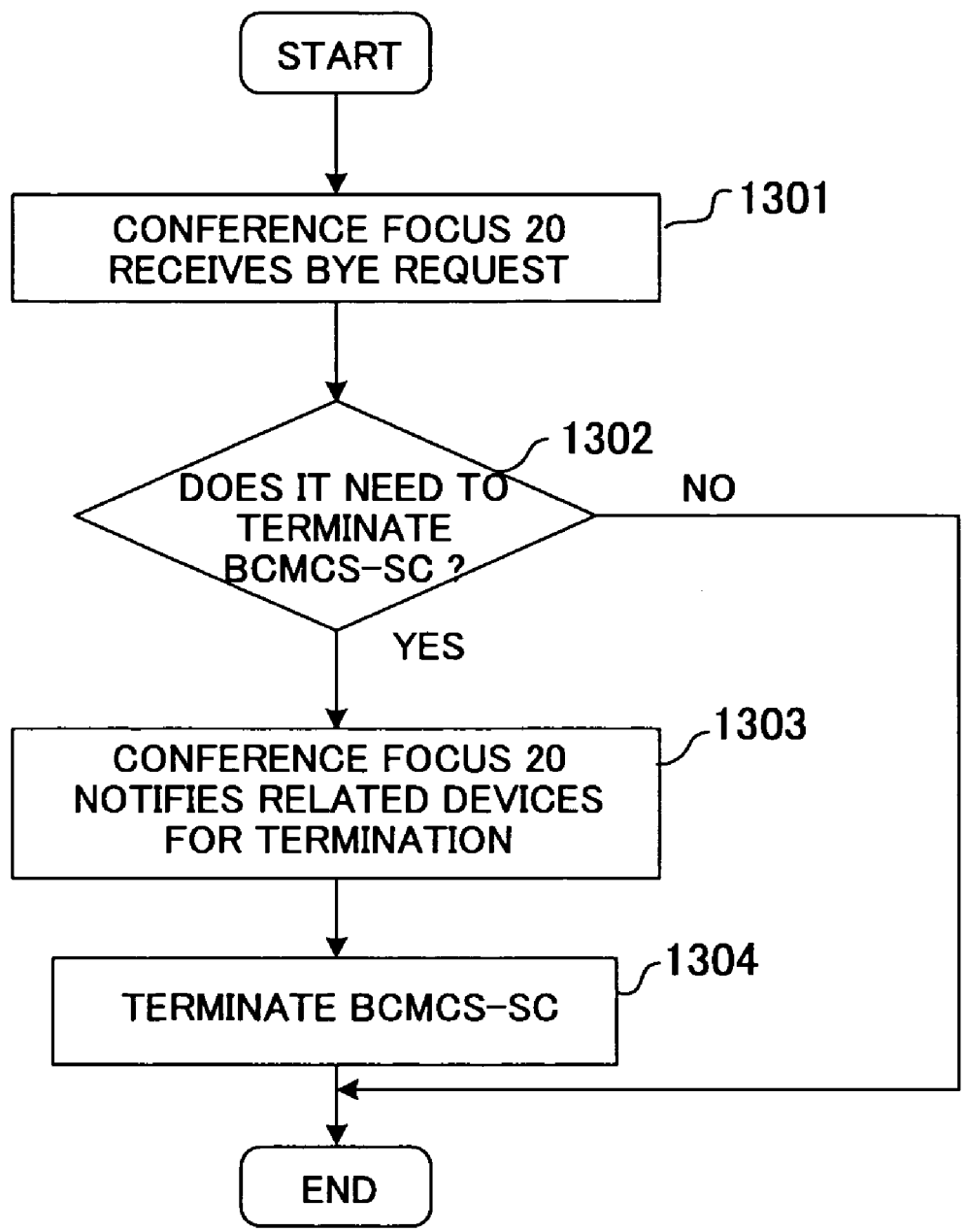
FIG. 13 is a flow chart showing a BCMCS-SC terminating procedure operation.

When the multi-party conference is to be terminated or it is not required to provide a MPCS using the BCMCS session, the BCMCS-SC must be terminated. FIG. 13 shows the flow chart of the operation of related new devices in the BCMCS-SC terminating procedure.

As shown in FIG. 13, when it is required to terminate the BCMCS session related to the BCMCS-SC, firstly, the conference focus 20 receives a terminating request from the related MPCS and BCMCS devices (step 1301). These devices include the mobile terminal 19 and SIP UA content provider server 17.

Next, in a step 1302, the BCMCS-SC handling module 9 in the conference focus 20 checks whether or not the state of the BCMCS-SC which is currently maintained should be terminated based on the received information. When it is confirmed that it is necessary to terminate, in a step 1303, the conference focus 20 notifies the related devices (mobile terminal 19, SIP UA content provider server 17 and BCMCS controller 18) to terminate the BCMCS session.

Next, each BCMCS-SC handling module terminates the maintained BCMCS-SC in each related device (step 1304).

Figure 14:
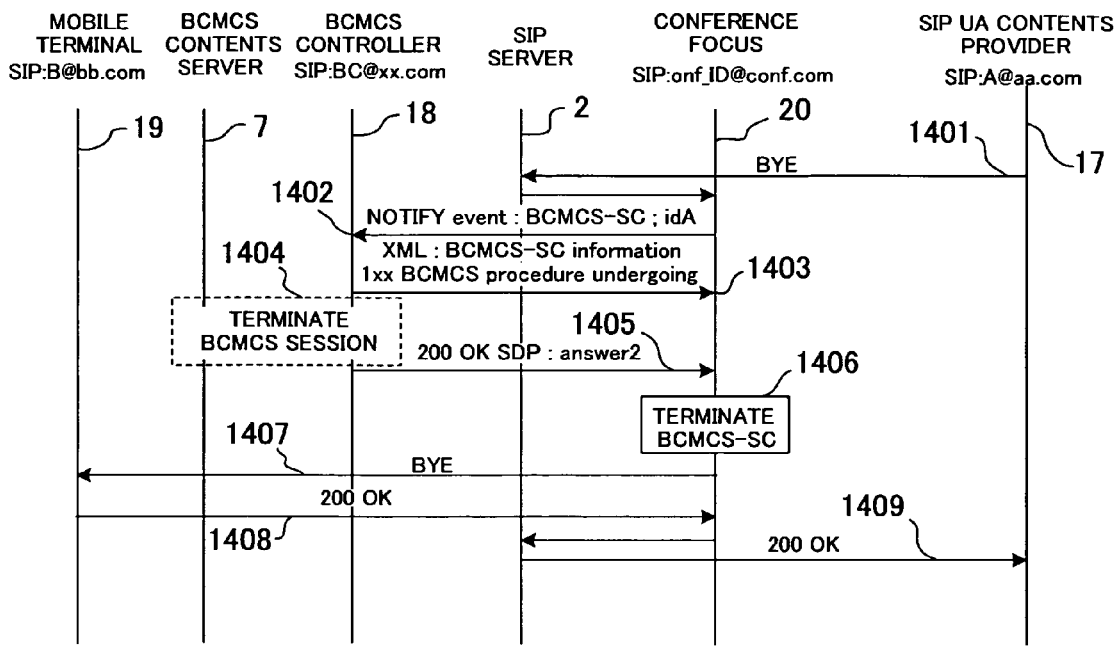
FIG. 14 is a flow chart of SIP messages of BCMCS-SC terminating sent by a SIP UA content provider server.
Figure 15:
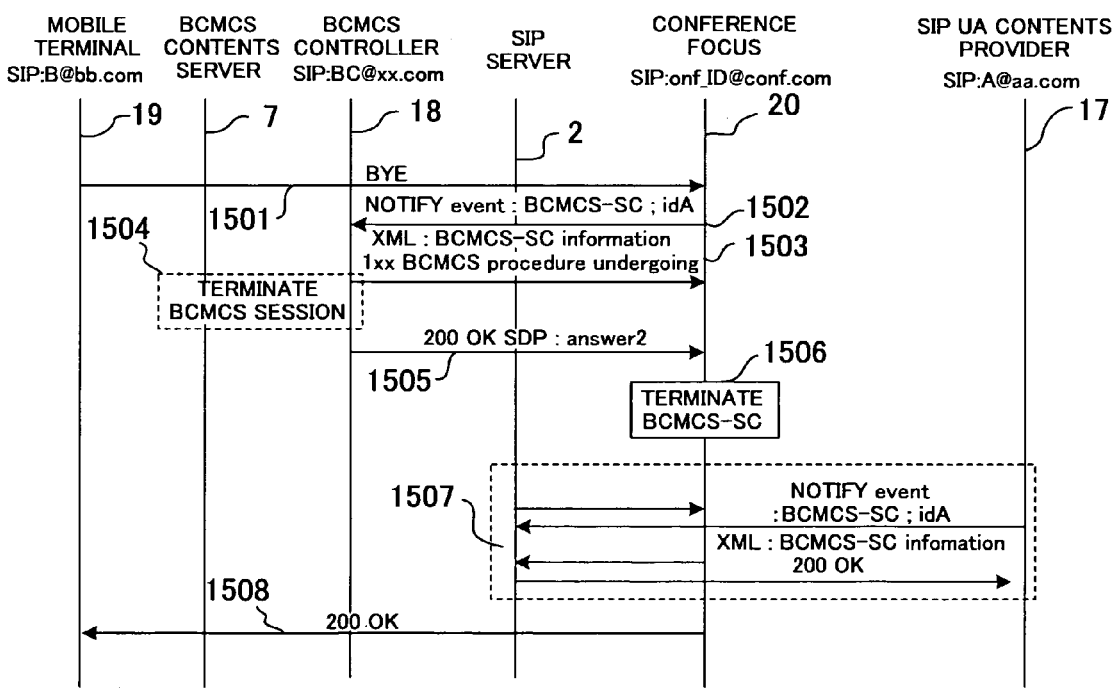
FIG. 15 is a flow chart of SIP messages of BCMCS-SC terminating sent by one mobile terminal.

FIG. 14 and FIG. 15 respectively show the SIP message process to terminate the BCMCS-SC sent respectively by the SIP UA content provider server 17 and mobile terminal 19.

FIG. 14 is a flow chart of the SIP message to terminate the BCMCS-SC sent by the SIP UA content provider server 17.

When the SIP UA content provider server 17 leaves the MPCS, it is necessary to send a process to terminate the BCMCS-SC. First, in FIG. 14, the SIP UA content provider server 17 sends a SIP message (BYE) to the conference focus 20 (step 1401).

Next, the conference focus 20 notifies the message to the BCMCS controller 18 via the BCMCS-SC notification service (step 1402). After the BCMCS controller 18 receives this notification message, the response "1xx BCMCS procedure in progress" must be sent to the conference focus 20 so that the conference focus 20 is notified that a BCMCS procedure is in progress (step 1403).

Next, the BCMCS controller 18 terminates the corresponding BCMCS session and recovers the related resources (step 1404).

After the conference focus 20 receives a 200 OK response which indicates that the BCMCS session has already terminated (step 1405), the corresponding BCMCS-SC is terminated (step 1406), and a BYE message can then be sent to the mobile terminal 19 (step 1407).

Finally, after receiving the 200 OK response from the mobile terminal 19, (step 1408), the conference focus 20 sends a terminating confirmation message to the SIP content provider server 17, and a 200 OK response is taken to be a response to the BYE message of the step 1401 (step 1409).

FIG. 15 is the BCMCS-SC terminating process sent by the mobile terminal 19.

When the mobile terminal 19 is the last BCMCS member user of the BCMCS-SC, and the mobile terminal 19 leaves the MPCS, a BCMCS-SC terminating process can be sent. Such a situation is described in FIG. 15.

First, the mobile terminal 19 sends a BYE message to the conference focus 20 (step 1501). The conference focus 20, when it notices that the mobile terminal 19 is the last member user of the BCMCS-SC (this BCMCS-SC terminal should be terminated), this is notified to the BCMCS controller 18 (step 1502).

The BCMCS controller 18 should terminate the corresponding BCMCS session to recover the related resources (step 1503 to step 1504).

After the conference focus 20 receives a confirmation message 200 OK that the BCMCS session has already been terminated (step 1505), the corresponding BCMCS-SC is terminated (step 1506), and this is notified to the corresponding SIP UA content provider server 17 (step 1507).

Finally, the conference focus 20 sends a 200 OK message, and this is taken as a response to the BYE message of step 1501 (step 1508).

The method of performing a multi-party conference service by using the broadcast/multicast service of the aforesaid wireless communication network of the invention can be implemented by software or hardware, or by a combination of software and hardware.

It will be understood that according to the method and one form of device provided by the invention, by forwarding a media flow of conference contents to plural mobile terminals using the down-link of one multicast by collecting broadcast/multicast services in a MPCS, the air interface resources of the wireless communications system related to the MPCS can be decreased.

In the invention, a BCMCS session in a MPCS is managed and maintained by establishing a service mapping relation between the BCMCS and MPCS, i.e., a BCMCS-SC. The method is simple, easy to maintain, and is convenient for upgrading and updating of the corresponding hardware.

Moreover, in the 3GPP2 standard, a BCMCS session can be sent only by a mobile terminal, but by using the technology described in the invention, the BCMCS session can be sent also from the SIP UA content provider server 17.

While the present invention has been described in detail and pictorially in the accompanying drawings, the present invention is not limited to such detail but covers various obvious modifications and equivalent arrangements, which fall within the purview of the appended claims.

What is claimed is:

1. A system for implementing a multi-party conference service (MPCS) using broadcast/multicast service of a wireless communications system, comprising:
   a conference focus of a multi-party conference service;
   a broadcast/multicast service controller;
   at least one mobile terminal; and
   at least one content providing server which provides content media flow to the at least one mobile terminal,
   wherein the conference focus receives media flow information related to a media flow from the at least one content providing server, and sends the received media flow information to the broadcast/multicast service controller,
   wherein the conference focus receives broadcast/multicast service session information to establish a broadcast/multicast service session generated based on the media flow information of the broadcast/multicast service controller,
   wherein the conference focus generates the context of a corresponding broadcast/multicast service session based on the received media flow information, multicast service session-related information and MPCS-related information, and wherein the conference focus sends the generated context of the broadcast/multicast service session to the at least one content providing server, the at least one mobile terminal and the broadcast/multicast service controller so that the at least one mobile terminal obtains the content media flow through the broadcast/multicast service session.

2. The system according to claim 1, wherein the broadcast/multicast service session is controlled based on a state of the context of the broadcast/multicast service session.

3. The system according to claim 2, further comprising:
a broadcast/multicast service content server,
wherein the conference focus receives an Internet Protocol (IP) address and a port number of the broadcast/multicast service content server from the broadcast/multicast service controller, and
wherein the conference focus sends the received IP address and the received port number to the at least one content providing server.

4. The system according to claim 3, the broadcast/multicast service session information, the session description of the media flow, and the identifier of the content providing server are sent to the at least one mobile terminal.

5. The system according to claim 1, wherein the generated context of the broadcast/multicast service session includes a context identifier of the broadcast/multicast service session, the media flow information, the multicast service session information, a number of users who are broadcast/multicast service members, and an identifier of each broadcast/multicast service member user.

6. The system according to claim 5,
wherein the media flow information includes at least the session description of the media flow, specific time information, and quality of service (QoS) information related to the media flow, and
wherein the broadcast/multicast service session information includes at least an identifier of a media flow of the broadcast/multicast service session generated based on the media flow information of the broadcast/multicast service controller.

7. The system according to claim 6, wherein the broadcast/multicast service session information further includes at least one of a multicast IP address and port number, broadcast/multicast service controller IP address, security information, and a maximum permitted number of users who are broadcast/multicast service members.

8. A system for implementing a multi-party conference service (MPCS) using broadcast/multicast service of a wireless communications system, comprising:
a conference focus of a multi-party conference service;
a broadcast/multicast service controller;
at least one mobile terminal; and
at least one content providing server which provides content media flow to the at least one mobile terminal,
wherein the broadcast/multicast service controller receives, from a conference focus of an MCPS, media flow information related to a media flow which the at least one content providing server attempts to provide,
wherein the broadcast/multicast service controller performs an initiation procedure based on the media flow information, generates broadcast/multicast service session information to establish a broadcast/multicast service session, and sends the generated broadcast/multicast service session information to the conference focus,
wherein the broadcast/multicast service controller receives the context of the broadcast/multicast service session from the conference focus generated based on the media flow information, broadcast/multicast service session information, and MPCS information which are related to the conference focus, and stores the received context, and
wherein the at least one content providing server sends the media flow to the at least one mobile terminal by a broadcast or multicast protocol by establishing a broadcast/multicast service session with the at least one mobile terminal.

9. The system according to claim 8, further comprising:
a broadcast/multicast service content server,
wherein the broadcast/multicast service controller sends an Internet Protocol (IP) address and a port number of the broadcast/multicast service content server to the conference focus so that the broadcast/multicast service content server receives the media flow from the at least one content providing server.

10. The system according to claim 9, wherein the conference focus controls the broadcast/multicast service session based on a state of the context of the broadcast/multicast service session.

11. The system according to claim 8, wherein the context of the broadcast/multicast service session includes a context identifier of the broadcast/multicast service session, the media flow information, multicast service session information, a number of users who are broadcast/multicast service members, and an identifier of each broadcast/multicast service member user.

12. The system according to claim 11, wherein the media flow information includes at least the session description of the media flow, specific time information, and quality of service (QoS) information related to the media flow, and
wherein the broadcast/multicast service session information includes at least an identifier of the media flow of the broadcast/multicast service session generated based on the media flow information of the broadcast/multicast service controller.

13. The system according to claim 12, wherein the broadcast/multicast service session information further includes at least one of a multicast IP address and port number, broadcast/multicast service controller IP address, security information, and a maximum permitted number of users who are broadcast/multicast service members.

14. A system for implementing a multi-party conference service (MPCS) by using broadcast/multicast service of a wireless communications system, comprising:
a conference focus of a multi-party conference service;
a broadcast/multicast service controller;
at least one mobile terminal; and
at least one content providing server which provides content media flow to the at least one mobile terminal,
wherein media flow information related to a transmission standby media flow is sent to the conference focus of the MPCS,
wherein the at least one content providing server receives an Internet Protocol (IP) address and a port number of the broadcast/multicast service content server from the conference focus,
wherein the broadcast/multicast service controller receives, from said conference focus, context of the broadcast/multicast service session generated based on the media flow information, broadcast/multicast service session-related information generated by a broadcast/multicast service controller and MPCS information, and stores the received context, and
wherein the at least one content providing server sends the media flow to the at least one mobile terminal via the broadcast/multicast service content server based on the IP address and port number of the broadcast/multicast service content server.

15. The system according to claim 14, wherein the media flow information includes at least the media flow information, the media flow session, specific time information and quality of service (QoS) information.

16. A system for implementing a multi-party conference service (MPCS) by using a broadcast/multicast service of a wireless communications system, comprising:
   a conference focus of a multi-party conference service;
   a broadcast/multicast service controller;
   at least one mobile terminal; and
   at least one content providing server which provides content media flow to the at least one mobile terminal,
   wherein media flow information related to a transmission standby media flow and broadcast/multicast service session information generated by a broadcast/multicast service controller is received from the conference focus,
   wherein the broadcast/multicast service controller receives, from the conference focus, context of the broadcast/multicast service session generated based on the media flow information, the broadcast/multicast service session information, and MPCS information, and stores the received context, and
   wherein a broadcast/multicast service session is established, and the media flow is received via the broadcast/multicast service.

17. The system according to claim 16, wherein a corresponding broadcast/multicast service session is operated based on a state of the context of the broadcast/multicast service session.

18. A conference focus of a multi-party conference service (MPCS) which supports to provide the MPCS by using the broadcast/multicast service of a wireless communications system, comprising:
   a signal transmission/reception module which sends or receives a signal of the MPCS;
   a conference focus module which receives a signal from the signal transmission/reception module or sends a signal via the signal transmission/reception module, and performs management and maintenance of the conference based on a group policy and media policy of the MPCS conference; and
   a context handling module of a broadcast/multicast service session which receives information from the conference focus, and performs initiation, modification or terminating of the context of the broadcast/multicast service session corresponding to the received information, or sends information related to the context of the broadcast/multicast service session to the conference focus,
   wherein the conference focus controls the corresponding broadcast/multicast service session based on the state of the context of the broadcast/multicast service session of the context handling module of the broadcast/multicast service session.

19. A broadcast/multicast service controller of a wireless communications system which supports a multi-party conference service (MPCS), comprising:
   a signal transmission/reception module which sends or receives the signal of an MPCS;
   a broadcast/multicast service control module which receives signal from the signal transmission/reception module, or sends signal via the signal transmission/reception module, and manages and maintains a broadcast/multicast service session; and
   a context handling module of a broadcast/multicast service session which receives context from the broadcast/multicast service control module, and performs storing, modification or terminating of the context of the broadcast/multicast service session or sends information related to the context of the broadcast/multicast service session to the broadcast/multicast service control module,
   wherein the broadcast/multicast service control module controls the corresponding broadcast/multicast service session based on the state of the context of the broadcast/multicast service session.

20. A content providing server of a multi-party conference service (MPCS) which provides a content media flow for at least one mobile terminal by using a broadcast/multicast service of a wireless communications system, comprising:
   a signal transmission/reception module which sends or receives a signal of the MPCS;
   a content providing module which receives a signal from the signal transmission/reception module or sends a signal via the signal transmission/reception module, and provides content media flow; and
   a context handling module of a broadcast/multicast service session which receives information from the content providing module, and performs initiation, modification or terminating of the context of the broadcast/multicast service session or sends information related to the context of the broadcast/multicast service session to the content providing module,
   wherein the content providing module provides the media flow via a broadcast/multicast service.

21. A mobile terminal of a wireless communications system which is provided with a multi-party conference service (MPCS) via a broadcast/multicast service, comprising:
   a signal transmission/reception module which sends or receives a signal of the MPCS;
   a mobile terminal module which receives a signal from the signal transmission/reception module, or sends a signal via the signal transmission/reception module and establishes a broadcast/multicast service session; and
   a context handling module of a broadcast/multicast service session which receives information from the mobile terminal module, and performs save, modification or terminating of the context of the broadcast/multicast service session, or sends information related to the context of the broadcast/multicast service session to the mobile terminal module, wherein the mobile terminal module controls the corresponding broadcast/multicast service session based on the context state of the broadcast/multicast service session.

22. A system for implementing a multi-party conference service (MPCS) by using broadcast/multicast service of a wireless communications system, comprising:
   a conference focus of a multi-party conference service;
   a broadcast/multicast service controller;
   at least one mobile terminal; and
   at least one content providing server which provides content media flow to the at least one mobile terminal,
   wherein the conference focus of the multi-party conference service receives media flow information related to a media flow from the at least one content providing server, and sends the received media flow information to the broadcast/multicast service controller,
   wherein the broadcast/multicast service controller generates broadcast/multicast service session information to establish a broadcast/multicast service session based on the media flow information, and sends the generated broadcast/multicast service session information to the conference focus, wherein the conference focus generates the context of the corresponding broadcast/multicast service session based on the obtained media flow information, the broadcast/multicast service session information and MPCS information, and sends the context of the broadcast/multicast service session to the at least one content providing server, the at least one mobile terminal and the broadcast/multicast service controller, respectively, wherein the at least one content providing server provides the media flow for the broadcast/multicast service content providing server based on the context of the received broadcast/multicast service session, and wherein the at least one mobile terminal and the broadcast/multicast service controller establish a broadcast/multicast service session based on the context of the received broadcast/multicast service session so that the at least one mobile terminal obtains the content media flow content, and wherein the conference focus, the broadcast/multicast service controller, the at least one mobile terminal and the at least one content providing server operate the corresponding broadcast/multicast service session based on the context of the broadcast/multicast service session.

23. A system for implementing a multi-party conference service (MPCS) by using the broadcast/multicast service of a wireless communications system, comprising:

a conference focus of a multi-party conference service, a broadcast/multicast service controller, at least one mobile terminal and at least one content providing server which provides content media flow to the at least one mobile terminal, wherein the conference focus, the broadcast/multicast service controller, the one or more mobile terminals and the one or more content providing servers respectively comprise:

a signal transmission/reception module which receives or sends a signal of the multi-party conference service; and a context handling module of a broadcast/multicast service session which processes information related to the context of the broadcast/multicast service session, wherein the conference focus generates the context of a corresponding broadcast/multicast service session in a context handling module of the broadcast/multicast service session based on the media flow information from the one or more content providing servers, the broadcast/multicast service session information from the broadcast/multicast service controller and MPCS information, sends the context of the broadcast/multicast service session to the one or more content providing servers, one or more mobile terminals and the broadcast/multicast service controller respectively via the signal transmission/reception module, and controls the broadcast/multicast service session which provides the content media flow for the mobile terminal based on the context of the broadcast/multicast service session; the broadcast/multicast service controller generates related information to establish a broadcast/multicast service session based on the media flow information from the conference focus, sends the information to the conference focus, receives the context of the broadcast/multicast service session from the conference focus in the context handling module of the broadcast/multicast service session, and stores and maintains the received context so as to control the corresponding broadcast/multicast service session based on the context of the broadcast/multicast service session, wherein the one or more content providing servers provide the media flow information to the conference focus so as to provide the media flow for the one or more mobile terminals via the content server of the broadcast/multicast service session, receives the context of the broadcast/multicast service session from the conference focus in the context handling module of the broadcast/multicast service session, and saves and maintains the received context, and wherein the one or more mobile terminals receives the context of the broadcast/multicast service session from the conference focus in the context handling module of the broadcast/multicast service session, stores and maintains the received context, operates the corresponding broadcast/multicast service session based on the context of the broadcast/multicast service session, and obtains the content media flow via the broadcast/multicast service session.

* * * * *